(12) United States Patent
Yamasaki et al.

(10) Patent No.: US 7,773,468 B2
(45) Date of Patent: Aug. 10, 2010

(54) OPTICAL HEAD AND OPTICAL INFORMATION RECORDER/REPRODUCER

(75) Inventors: Fumitomo Yamasaki, Nara (JP); Eishin Mori, Kyoto (JP); Hideki Aikoh, Osaka (JP); Akihiro Arai, Kyoto (JP); Joji Anzai, Osaka (JP)

(73) Assignee: Panasonic Corporation, Osaka (JP)

( * ) Notice: Subject to any disclaimer, the term of this patent is extended or adjusted under 35 U.S.C. 154(b) by 904 days.

(21) Appl. No.: 11/570,821

(22) PCT Filed: Apr. 11, 2006

(86) PCT No.: PCT/JP2006/307674

§ 371 (c)(1),
(2), (4) Date: Dec. 18, 2006

(87) PCT Pub. No.: WO2006/115046

PCT Pub. Date: Nov. 2, 2006

(65) Prior Publication Data

US 2007/0268806 A1    Nov. 22, 2007

(51) Int. Cl.
*G11B 7/00* (2006.01)

(52) U.S. Cl. ............ 369/44.23; 369/44.32; 369/112.02; 369/112.01

(58) Field of Classification Search ............ None
See application file for complete search history.

(56) References Cited

U.S. PATENT DOCUMENTS

2002/0105890 A1* 8/2002 Ogasawara ........... 369/112.02
2002/0191502 A1* 12/2002 Hirai .................... 369/44.24
2005/0083813 A1* 4/2005 Ogasawara ............. 369/53.2

FOREIGN PATENT DOCUMENTS

| JP | 11-259906 | 9/1999 |
|---|---|---|
| JP | 2001-331964 | 11/2001 |
| JP | 2002-170257 | 6/2002 |
| JP | 2003-077142 | 3/2003 |
| JP | 2004-265592 | 9/2004 |
| JP | 2005-267756 | 9/2005 |

OTHER PUBLICATIONS

International Search Report for application No. PCT/JP2006/307674 dated May 16, 2006.

* cited by examiner

*Primary Examiner*—Jorge L Ortiz Criado
(74) *Attorney, Agent, or Firm*—RatnerPrestia

(57) ABSTRACT

Fifth order spherical aberration in addition to third order spherical aberration for an optical information recording medium of which thickness of a light transmission layer changes greatly is corrected. An objective lens collects a laser beam emitted from a semiconductor laser on an optical information recording medium. A spherical aberration correcting portion corrects spherical aberration generated according to a thickness of the light transmission layer of the optical information recording medium, in which the spherical aberration correcting portion includes a collimator lens, a lens holder and a stepping motor for correcting the third order spherical aberration and a liquid crystal element and an applied voltage control portion for correcting the fifth order spherical aberration.

15 Claims, 20 Drawing Sheets (a)  (b)  (c)

OPTICAL HEAD AND OPTICAL INFORMATION RECORDER/REPRODUCER

CROSS-REFERENCE TO RELATED APPLICATIONS

This application is a U.S. national phase application of PCT International Patent Application No. PCT/JP2006/307674 filed Apr. 11, 2006, claiming the benefit of priority of Japanese Patent Application No. 2005-123216 filed Apr. 21, 2005, all of which are incorporated by reference herein in their entirety.

TECHNICAL FIELD

The present invention relates to an optical head used when performing recording and/or reproduction on an optical information recording medium and an optical information recording and reproducing apparatus comprising such an optical head.

In conjunction with increasing capacity of the optical information recording medium, a light source of the optical head used to perform recording and/or reproduction thereon is becoming shorter-wavelength and NA (Numerical Aperture) of an objective lens is increasing. However, influence of spherical aberration due to change in thickness of a light transmission layer of the optical information recording medium becomes conspicuous in conjunction with the increase in NA.

In the case of a wavelength 650 nm and NA of the objective lens 0.60 used for a DVD, the spherical aberration of approximately 10 mλ is generated for the change in thickness of 10 μm of the light transmission layer. However, the spherical aberration of approximately 100 mλ is generated for the change in thickness of 10 μm of the light transmission layer in the case of the wavelength 400 nm and NA of the objective lens 0.85 used for a next-generation optical information recording medium. For that reason, the optical head of such an optical information recording medium requires an instrument which corrects the spherical aberration.

Japanese Patent Laid-Open No. 11-259906 discloses a method of the optical information recording and reproducing apparatus which has a collimator lens mounted on a collimator lens actuator and moves the collimator lens placed between the light source and the objective lens to counter the spherical aberration generated by a thickness error of the light transmission layer. This optical information recording and reproducing apparatus will be described concretely by using FIG. 18.

FIG. 18 shows a configuration of a conventional optical head. In FIG. 18, reference numeral 101 denotes a light source, 102 denotes a beam splitter, 103 denotes a ¼ wavelength plate, 104 denotes a collimator lens, 106 denotes an objective lens, 107 denotes a multi-lens, 108 denotes a light receiving element, 109 denotes a biaxial actuator for driving the objective lens 106, and 110 denotes a collimator lens actuator for driving the collimator lens 104. They configure an optical head 120.

A laser beam emitted from the light source 101 passes through the beam splitter 102 and enters the collimator lens 104. The laser beam having entered the collimator lens 104 is rendered as parallel light by the collimator lens 104 in the case where the thickness of a light transmission layer 131 of an optical information recording medium 130 is per specified value. The collimator lens 104 is mounted on the collimator lens actuator 110, and is allowed by the collimator lens actuator 110 to move forward and backward along an optical axis of the laser beam.

The laser beam having passed through the collimator lens 104 is put in a circularly-polarized state on passing through the ¼ wavelength plate 103, and enters the objective lens 106. The laser beam collected by the objective lens 106 and having entered an information recording surface of the optical information recording medium 130 is reflected on the information recording surface so as to be a return beam. The return beam passes through the objective lens 106 by following its original light path, and then enters the ¼ wavelength plate 103. The return beam passes through the ¼ wavelength plate 103 and thereby becomes linearly-polarized light rotated by 90 degrees in a polarization direction of an approach route. Thereafter, the return beam is rendered as converging rays by the collimator lens 104 and then reflected by the polarization beam splitter 102. The return beam reflected by the beam splitter 102 enters the light receiving element 108 via the multi-lens 107 so as to be detected.

When using the optical head 120 and performing recording and reproduction by collecting light on the information recording surface of the optical information recording medium 130, main aberration generated by the thickness error of the light transmission layer 131 of the optical information recording medium 130 is the aberration due to a defocus and the spherical aberration. The defocus is corrected by a focus servo. To be more specific, the objective lens 106 is moved in an optical axis direction by the biaxial actuator 109 based on the focus servo from the light receiving element 108 so as to correct the defocus and put the information recording surface into focus.

As for the spherical aberration, the laser beam entering the objective lens 106 is rendered as divergent rays or converging rays to generate the spherical aberration of a reverse polarity to the spherical aberration generated according to the thickness of the light transmission layer 131 so as to make a correction. To be more precise, the collimator lens 104 is moved forward and backward in the optical axis direction by the collimator lens actuator 110 to render the laser beam entering the objective lens 106 as the divergent rays or converging rays and generate the spherical aberration of the reverse polarity on the objective lens 106 so as to cancel the spherical aberration generated by the thickness error of the light transmission layer 131.

Thus, when it passes through the objective lens 106 and is focused on the information recording surface, the optical head 120 is in a state in which the spherical aberration is canceled.

To further increase the capacity of the optical information recording medium, consideration is given to rendering the information recording surface as a multilayer structure. In the case of rendering the information recording surface multilayer, information is recorded and/or reproduced on multiple information recording surfaces. As the thickness of the light transmission layer is different as to each of the information recording surfaces, however, the spherical aberration is generated on the information recording surface displaced from an optimum material thickness (light transmission layer thickness at which residual aberration is minimal) of the objective lens according to the thickness of the light transmission layer from the optimum material thickness to a predetermined information recording surface.

Third order spherical aberration becomes larger in proportion to the thickness of the light transmission layer from the optimum material thickness to the predetermined information recording surface. If the information recording surface is rendered multilayer to change spacing among the light transmission layers greatly, the third order spherical aberration to be corrected also increases. Therefore, a moving range of the collimator lens is remarkably expanded as to the conventional optical head.

For instance, FIG. 19 shows the moving range of the collimator lens (the direction closer to the objective lens is positive (+)) in the case of wavelength of the light source $\lambda=405$ nm, NA of the objective lens=0.85, focal length of the objective lens 1.3 mm, focal length of the collimator lens 19.0 mm, and optimum material thickness (light transmission layer thickness of the optical information recording medium at which residual aberration is minimal) of the objective lens 62.5 μm. It is understandable from FIG. 19 that the moving range of the collimator lens becomes 10 mm or more in the case where the thickness of the light transmission layer changes from 25 μm to 100 μm.

Furthermore, if the thickness of the light transmission layer increases, fifth order spherical aberration is generated in an unignorable size on the objective lens.

FIG. 20 shows a fifth order spherical aberration amount after correcting the third order spherical aberration generated by the change in thickness of the light transmission layer by moving the collimator lens under the conditions. According to FIG. 20, the fifth order spherical aberration is an ignorable size of ±5 mλ in the case where the change in thickness of the light transmission layer is ±10 μm or so while the fifth order spherical aberration amount reaches ±20 mλ in the case of the optical information recording medium of which thickness of the light transmission layer changes from 25 μm to 100 μm. The fifth order spherical aberration is an amount that remains even after correcting the third order spherical aberration by moving the collimator lens.

Thus, as for the optical information recording medium of which information recording surface is rendered multilayer, it is necessary, as a discovered problem, to consider influence over the recording and/or reproduction as to the fifth order spherical aberration in addition to the third order spherical aberration.

The present invention has been made in view of such a problem, and an object thereof is to provide an optical head capable of correcting the unignorable fifth order spherical aberration in addition to the third order spherical aberration to secure good recording and/or reproduction for the optical information recording medium of which thickness of the light transmission layer changes greatly and an optical information recording and reproducing apparatus comprising such an optical head.

DISCLOSURE OF THE INVENTION

To achieve the above object, the 1st aspect of the present invention is an optical head comprising:

a light source;

an objective lens for collecting a laser beam emitted from the light source on an optical information recording medium; and a spherical aberration correcting portion for correcting spherical aberration generated according to a thickness of a light transmission layer of the optical information recording medium, wherein the spherical aberration correcting portion includes:

a first spherical aberration correcting portion for correcting third order spherical aberration; and a second spherical aberration correcting portion for correcting fifth order spherical aberration, wherein the second spherical aberration correcting portion corrects the fifth order spherical aberration according to an amount of the third order spherical aberration which the first spherical aberration correcting portion corrects.

The 3rd aspect of the present invention is the optical head according to the 1st aspect of the present invention, wherein the second spherical aberration correcting portion selects a predetermined correction amount from multiple preset fifth order spherical aberration correction amounts according to the amount of the third order spherical aberration which the first spherical aberration correcting portion corrects, and corrects the fifth order spherical aberration by the selected correction amount.

The 4th aspect of the present invention is the optical head according to the 3rd aspect of the present invention, wherein the objective lens is designed to generate the fifth order spherical aberration of a predetermined value at a predetermined reference thickness at which the third order spherical aberration of the optical information recording medium is minimal; and the second spherical aberration correcting portion corrects the fifth order spherical aberration by generating the fifth order spherical aberration of a reverse polarity to the fifth order spherical aberration of the predetermined value.

The 5th aspect of the present invention is the optical head according to the 1st aspect of the present invention, wherein the first spherical aberration correcting portion includes a collimator lens for moving in an optical axis direction of the laser beam, and corrects the third order spherical aberration by moving the collimator lens; and the second spherical aberration correcting portion corrects the fifth order spherical aberration by using a position of the collimator lens as an amount corresponding to the amount of the third order spherical aberration which the first spherical aberration correcting portion corrects.

The 6th aspect of the present invention is the optical head according to the 1st aspect of the present invention, wherein the first spherical aberration correcting portion includes a collimator lens for moving in an optical axis direction of the laser beam, and corrects the third order spherical aberration by moving the collimator lens; and the second spherical aberration correcting portion corrects the fifth order spherical aberration by using an output value of a position signal according to the position of the collimator lens as the amount corresponding to the amount of the third order spherical aberration which the first spherical aberration correcting portion corrects.

The 7th aspect of the present invention is the optical head according to the 1st aspect of the present invention, wherein the first spherical aberration correcting portion includes a collimator lens for moving in an optical axis direction of the laser beam, and corrects the third order spherical aberration by moving the collimator lens; and the second spherical aberration correcting portion corrects the fifth order spherical aberration by using an output of a driving signal for driving the collimator lens as the amount corresponding to the amount of the third order spherical aberration which the first spherical aberration correcting portion corrects.

The 8th aspect of the present invention is the optical head according to the 1st aspect of the present invention, wherein the second spherical aberration correcting portion includes a liquid crystal element.

The 9th aspect of the present invention is the optical head according to the 8th aspect of the present invention, wherein the liquid crystal element is provided to a movable portion of an actuator for driving the objective lens.

The 10th aspect of the present invention is the optical head according to the 9th aspect of the present invention, wherein the liquid crystal element is driven through a suspension for holding the movable portion of the actuator.

The 11th aspect of the present invention is the optical head according to the 10th aspect of the present invention, wherein a driving signal for driving the liquid crystal element is superimposed on a driving signal for driving the movable portion of the actuator.

The 12th aspect of the present invention is the optical head according to the 8th aspect of the present invention, wherein the first spherical aberration correcting portion includes the liquid crystal element and corrects the third order spherical aberration by applying a voltage to the liquid crystal element; and the second spherical aberration correcting portion corrects the fifth order spherical aberration by using a voltage level applied to the liquid crystal element of the first spherical aberration correcting portion as the amount corresponding to the amount of the third order spherical aberration which the first spherical aberration correcting portion corrects.

The 13th aspect of the present invention is the optical head according to the 12th aspect of the present invention, wherein the liquid crystal element of the first spherical aberration correcting portion and the liquid crystal element of the second spherical aberration correcting portion are integrally formed.

The 14th aspect of the present invention is the optical head according to the 12th aspect of the present invention, wherein the liquid crystal element of the first spherical aberration correcting portion and the liquid crystal element of the second spherical aberration correcting portion are separate liquid crystal elements respectively.

The 15th aspect of the present invention is the optical head according to the 1st aspect of the present invention, wherein the first spherical aberration correcting portion includes a collimator lens for moving in an optical axis direction of the laser beam and a liquid crystal element, and corrects a part of the third order spherical aberration by moving the collimator lens and corrects the rest of the third order spherical aberration by applying a voltage to the liquid crystal element.

The 16th aspect of the present invention is the optical head comprising:

a light source;

an objective lens for collecting a laser beam emitted from the light source on an optical information recording medium; and a spherical aberration correcting portion for correcting spherical aberration generated according to a thickness of a light transmission layer of the optical information recording medium, wherein the spherical aberration correcting portion includes:

a first spherical aberration correcting portion for correcting third order spherical aberration; and a second spherical aberration correcting portion for correcting fifth order spherical aberration, wherein the optical information recording medium includes at least two information recording surfaces as subjects for recording and/or reproducing information; and the second spherical aberration correcting portion corrects the fifth order spherical aberration by using a predetermined value corresponding to each of the information recording surfaces.

The 17th aspect of the present invention is the optical head according to the 16th aspect of the present invention, comprising a layer determining portion for determining the information recording surfaces as the subjects of recording and/or reproduction of the optical information recording medium, wherein the second spherical aberration correcting portion corrects the fifth order spherical aberration according to a determination result of the layer determining portion.

The 18th aspect of the present invention is an optical information recording and reproducing apparatus comprising:

the optical head according to the 1st aspect of the present invention;

a drive for driving the optical information recording medium; and a control portion for controlling the optical head and the drive.

The 19th aspect of the present invention is an optical information recording and reproducing apparatus comprising:

the optical head according to the 16th aspect of the present invention;

a drive for driving the optical information recording medium; and a control portion for controlling the optical head and the drive.

The optical head and the optical information recording and reproducing apparatus of the present invention can correct the unignorable fifth order spherical aberration in addition to correction of the third order spherical aberration when recording and/or reproducing information on the optical information recording medium of which thickness of the light transmission layer changes greatly due to the information recording surface being rendered multilayer so as to have a beneficial effect of securing good recording and reproduction performance for such an optical information recording medium.

BRIEF DESCRIPTION OF THE DRAWINGS

FIG. 5 (b) is a diagram showing a wave front of the fifth order spherical aberration;

FIG. 5 (c) is a diagram showing the wave front after being corrected by the liquid crystal element 20;

FIG. 13 (*b*) is a diagram showing the wave front of a third order spherical aberration;

FIG. 13 (*c*) is a diagram showing the wave front after being corrected by the liquid crystal element 21;

FIG. 14 (*b*) is a diagram showing the wave front of the third order spherical aberration;

FIG. 14 (*c*) is a diagram showing the wave front after being corrected by the liquid crystal element 21;

DESCRIPTION OF SYMBOLS

Figure 1:
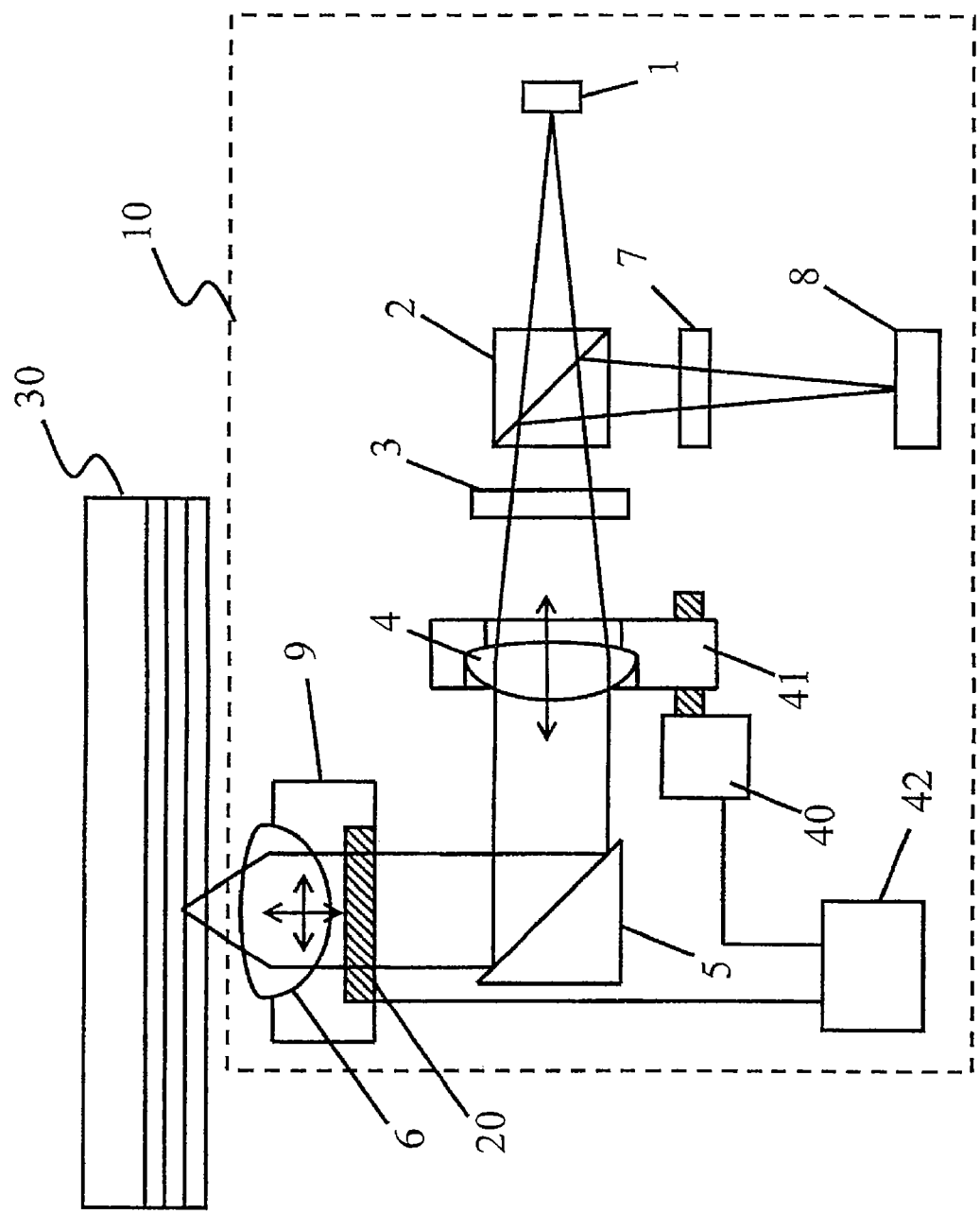
FIG. 1 is a schematic block diagram of an optical head according to an embodiment of the present invention.

1 Semiconductor laser
2, 102 Beam splitters
3, 103 ¼ wavelength plates
4, 104 Collimator lenses
5 Reflecting mirror
6, 106 Objective lenses
7 Detection lens
8, 108 Light receiving elements
9, 109 Biaxial actuators
10, 11, 120 Optical heads
20, 21 Liquid crystal elements
30, 130 Optical information recording media
31, 32, 33, 34 Information recording surfaces
42 Applied voltage control portion
50 Housing
51 Optical information recording medium drive
52 Control portion
107 Multi-lens
110 Collimator lens actuator
131 Light transmission layer

BEST MODE FOR CARRYING OUT THE INVENTION

Embodiments of an optical head and an optical information recording and reproducing apparatus of the present invention will be described below with reference to the drawings.

First Embodiment

FIG. 1 is a schematic block diagram of the optical head according to a first embodiment of the present invention.

Figure 2:
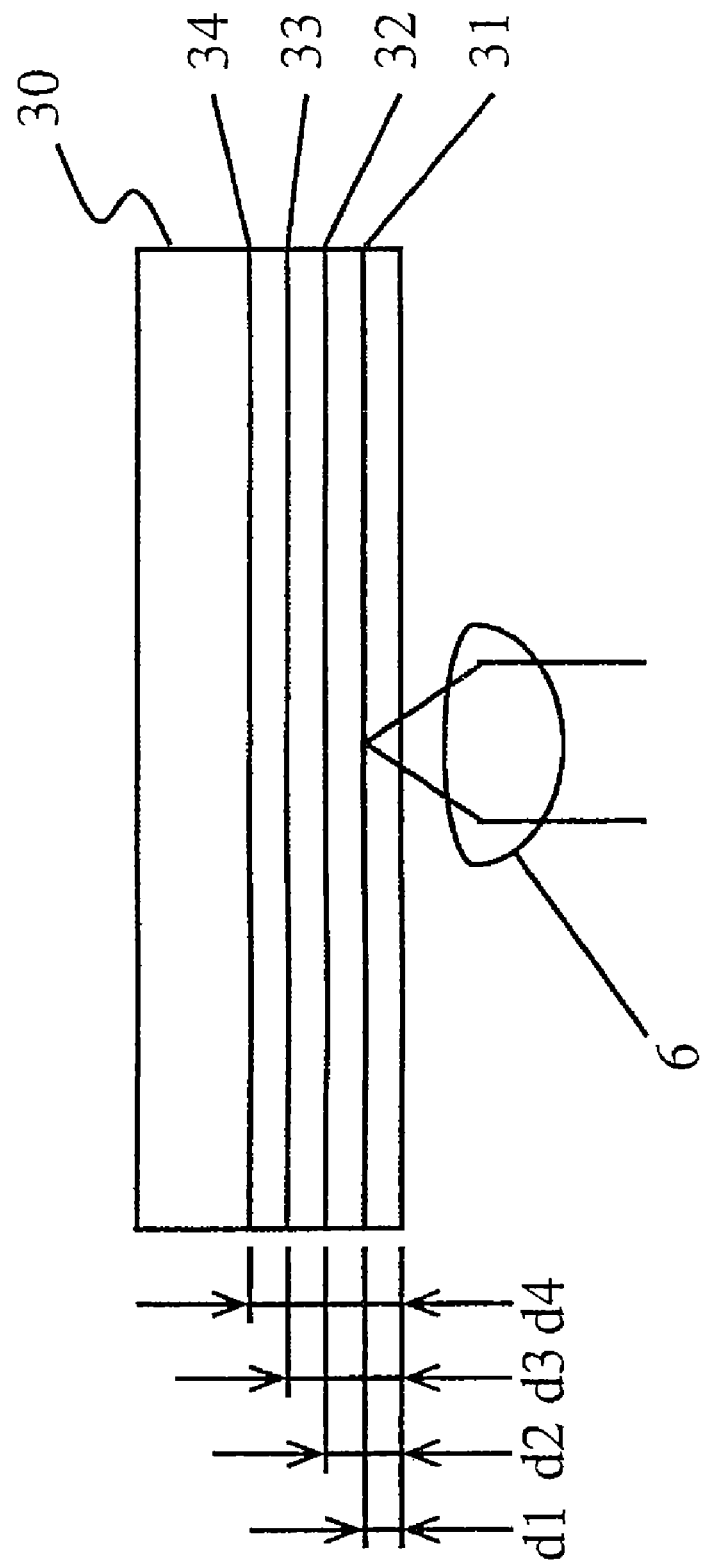
FIG. 2 is a schematic block diagram of an optical information recording medium according to the embodiment of the present invention.

In FIG. 1, reference numeral 1 denotes a semiconductor laser, 2 denotes a beam splitter, 3 denotes a ¼ wavelength plate, 4 denotes a collimator lens, 5 denotes a reflecting mirror, 6 denotes an objective lens, 7 denotes a detection lens, 8 denotes a light receiving element, 9 denotes a biaxial actuator for driving the objective lens 6, 20 denotes a liquid crystal element, 40 denotes a stepping motor for driving the collimator lens 4, 41 denotes a lens holder for holding the collimator lens 4, and 42 denotes an applied voltage control portion for controlling a voltage applied to the liquid crystal element 20 based on a driving amount of the stepping motor 40. They configure an optical head 10. Reference numeral 30 denotes an optical information recording medium including a transparent substrate. As shown in FIG. 2, the optical information recording medium 30 has information recording surfaces 31, 32, 33 and 34 formed thereon from a light incidence side (objective lens 6 side). Their respective thicknesses of a light transmission layer from the surface to the information recording surface are d1, d2, d3 and d4 (d1<d2<d3<d4).

In the configuration, the semiconductor laser 1 is equivalent to a light source of the present invention, and the objective lens 6 is equivalent to the objective lens of the present invention. The collimator lens 4, stepping motor 40 and lens holder 41 are equivalent to a first spherical aberration correcting portion while the liquid crystal element 20 and applied voltage control portion 42 are equivalent to a second spherical aberration correcting portion of the present invention.

A description will be given as to operation of the optical head 10 in the case of recording or reproducing information on such an optical information recording medium 30. A linearly-polarized laser beam emitted from the semiconductor laser 1 passes through the beam splitter 2 and is converted to circularly-polarized light on the ¼ wavelength plate 3. It is converted to parallel light by the collimator lens 4, reflected on the reflecting mirror 5 and passes through the liquid crystal element 20 so as to be collected as a light spot on one of the information recording surfaces 31 to 34 of the optical information recording medium 30 over the transparent substrate by the objective lens 6.

The laser beam reflected on one of the information recording surfaces 31 to 34 passes through the objective lens 6 and the liquid crystal element 20 again, is reflected on the reflecting mirror 5, passes through the collimator lens 4 and is converted to linearly-polarized light different from an approach route on the ¼ wavelength plate 3. It is reflected on the beam splitter 2 thereafter, and is led to the light receiving element 8 by the detection lens 7. The laser beam detected by the light receiving element 8 is photoelectrically converted and then calculated to generate a focus error signal for following a surface deflection of the optical information recording medium 30 and a tracking error signal for following decentering. The biaxial actuator 9 drives the objective lens 6 in a biaxial direction according to the focus error signal and the tracking error signal so as to have the light spot follow an information track of the rotating optical information recording medium 30.

The collimator lens 4 is held by the lens holder 41, and is rendered movable along an optical axis of the laser beam by the stepping motor 40. According to the thicknesses of the light transmission layers of the information recording surfaces 31 to 34 and further in the case where the thicknesses of the light transmission layers are out of specified values, the laser beam is rendered as divergent rays or converging rays by the collimator lens 4 to correct third order spherical aberration associated with change in the thicknesses of the light transmission layers so as to generate the spherical aberration of a reverse polarity on the objective lens 6 and correct the third order spherical aberration.

Figure 3:
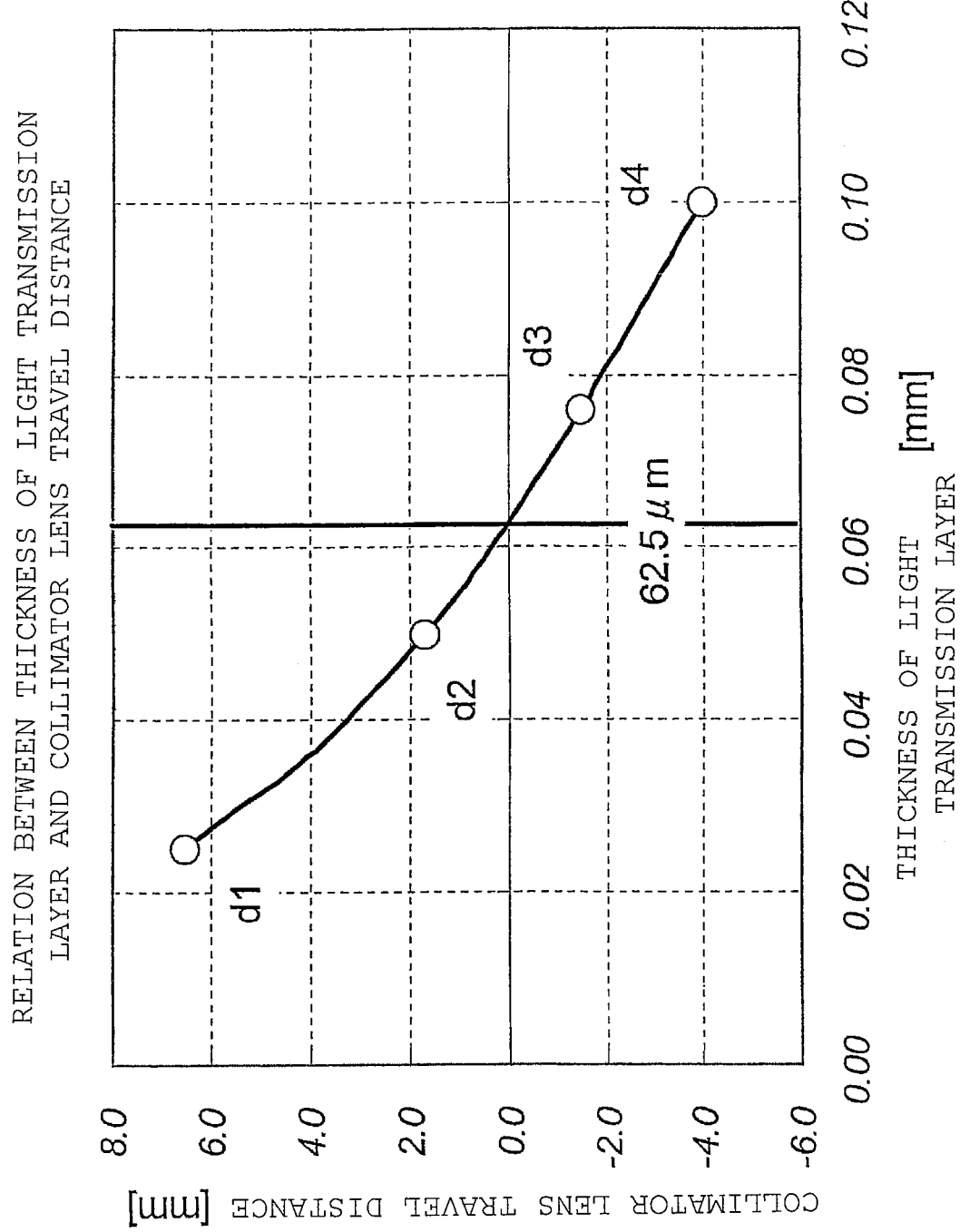
FIG. 3 is a diagram showing a relation between thickness of a light transmission layer and a collimator lens travel distance according to the embodiment of the present invention.

FIG. 3 is a result of seeking a relation between the thickness of the light transmission layer to be corrected and a collimator lens travel distance by calculation according to this embodiment. Its axis of abscissas indicates the thickness of the light transmission layer to be corrected, and its axis of ordinates indicates the travel distance of the collimator lens 4. Concrete values of the parameters used for the calculation are as follows.

Wavelength of the semiconductor laser 1 $\lambda$=405 nm
NA of the objective lens 6 NA=0.85
Focal length of the objective lens 6 fol=1.3 mm
Focal length of the collimator lens 4 fcl=19.0 mm
Thicknesses of the light transmission layers of the information recording surfaces 31 to 34 d1=25 µm, d2=50 µm, d3=75 µm, d4=100 µm
Refractive index n of the light transmission layers of optical information recording medium 30 n=1.6

As for the travel distance of the collimator lens 4, the direction closer to the objective lens 6 is positive (+) in reference to the case where an optimum material thickness (thickness of the light transmission layer of the optical information recording medium at which residual aberration is minimal) of the objective lens 6 is 62.5 µm.

It is understandable from FIG. 3 that the collimator lens 4 of this embodiment requires the travel distance of approximately 10 mm to correct the third order spherical aberration corresponding to the respective thicknesses of the light transmission layers d1 to d4 of the optical information recording medium 30. As the thicknesses of the light transmission layers themselves have errors, a still larger moving range is required in reality.

As described in the background art, it is possible to significantly reduce the third order spherical aberration generated by the change and errors in the thicknesses of the light transmission layers by adjusting the laser beam from the collimator lens 4 to become the divergent rays or converging rays.

Due to increase in the thicknesses of the light transmission layers, however, fifth order spherical aberration is generated in an unignorable amount. It is not possible to eliminate a component of the spherical aberration higher-order than the third order in the case of a correction by moving the collimator lens 4.

Figure 5:
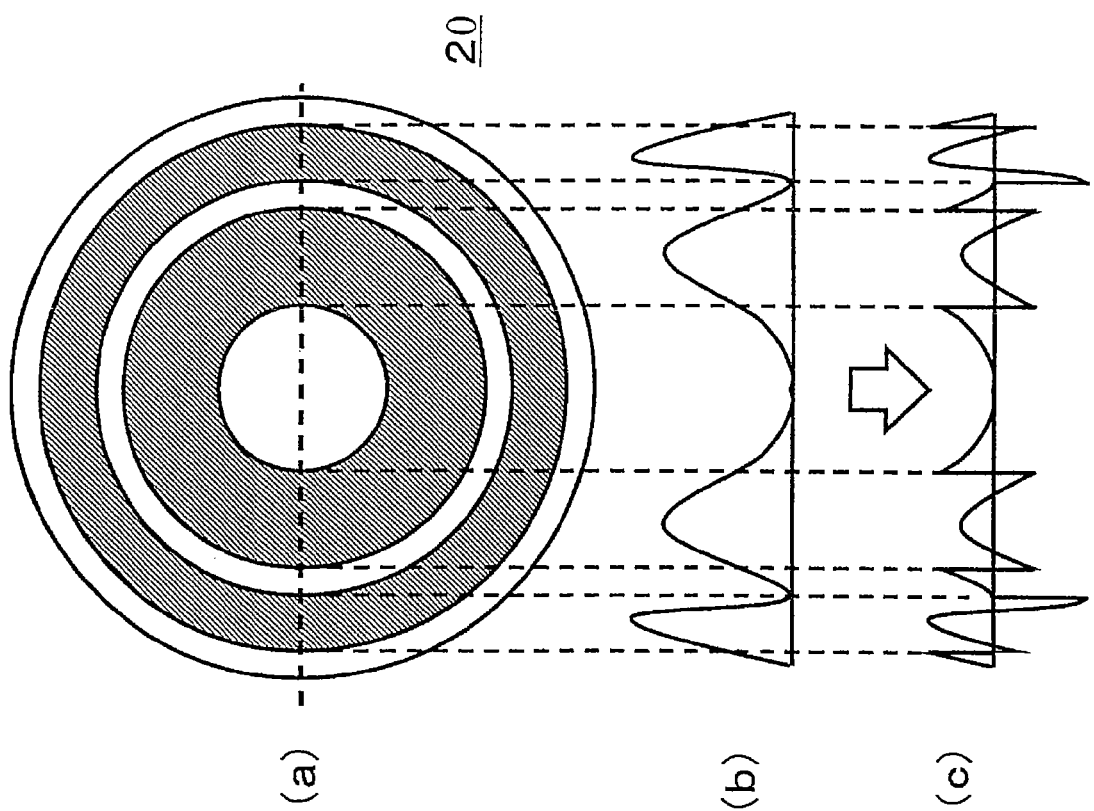
FIG. 5 (a) is a block diagram showing an electrode division pattern of a liquid crystal element 20 according to the embodiment of the present invention.

Thus, according to this embodiment, the fifth order spherical aberration is corrected by the liquid crystal element 20 mounted on the biaxial actuator 9. The liquid crystal element 20 controls the refractive index of liquid crystal by applying a voltage individually to each of the electrodes divided into multiple regions and corrects the aberration by generating a phase difference. The fifth order spherical aberration which remains and appears after correcting the third order spherical aberration is in the shape of a wave front shown in FIG. 5 (b). Correspondingly to this shape, the electrode of the liquid crystal element 20 is formed in a concentric shape shown in FIG. 5 (a) (the shaded portion in FIG. 5 (a)). A predetermined voltage described later is applied to the electrode through the control of the applied voltage control portion 42 so as to generate the phase difference between transparent portions (white portions in FIG. 5 (b)) and the light passing through the electrode. The wave front having the phase difference generated thereon takes on a wave front shape shown in FIG. 5 (c) so that it becomes possible to reduce the fifth order spherical aberration.

Figure 4:
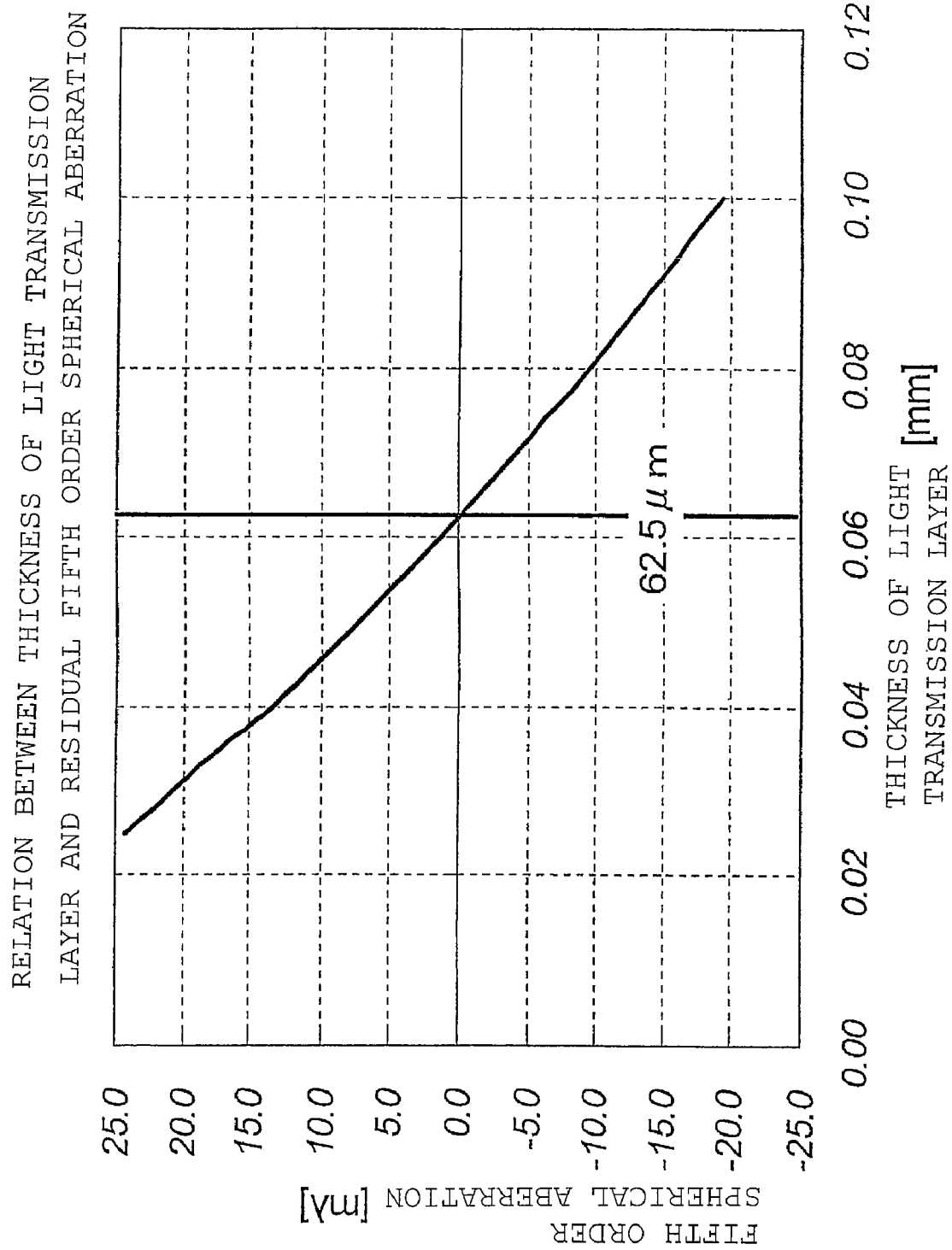
FIG. 4 is a diagram showing a relation between the thickness of the light transmission layer and residual fifth order spherical aberration according to the embodiment of the present invention.

In this case, as for the relation between the thickness of the light transmission layer to be corrected and a generated amount of the fifth order spherical aberration remaining after the correction of the third order spherical aberration, the generated amount of the fifth order spherical aberration is almost in proportion to the thickness of the light transmission layer to be corrected as shown in FIG. 4.

Figure 6:
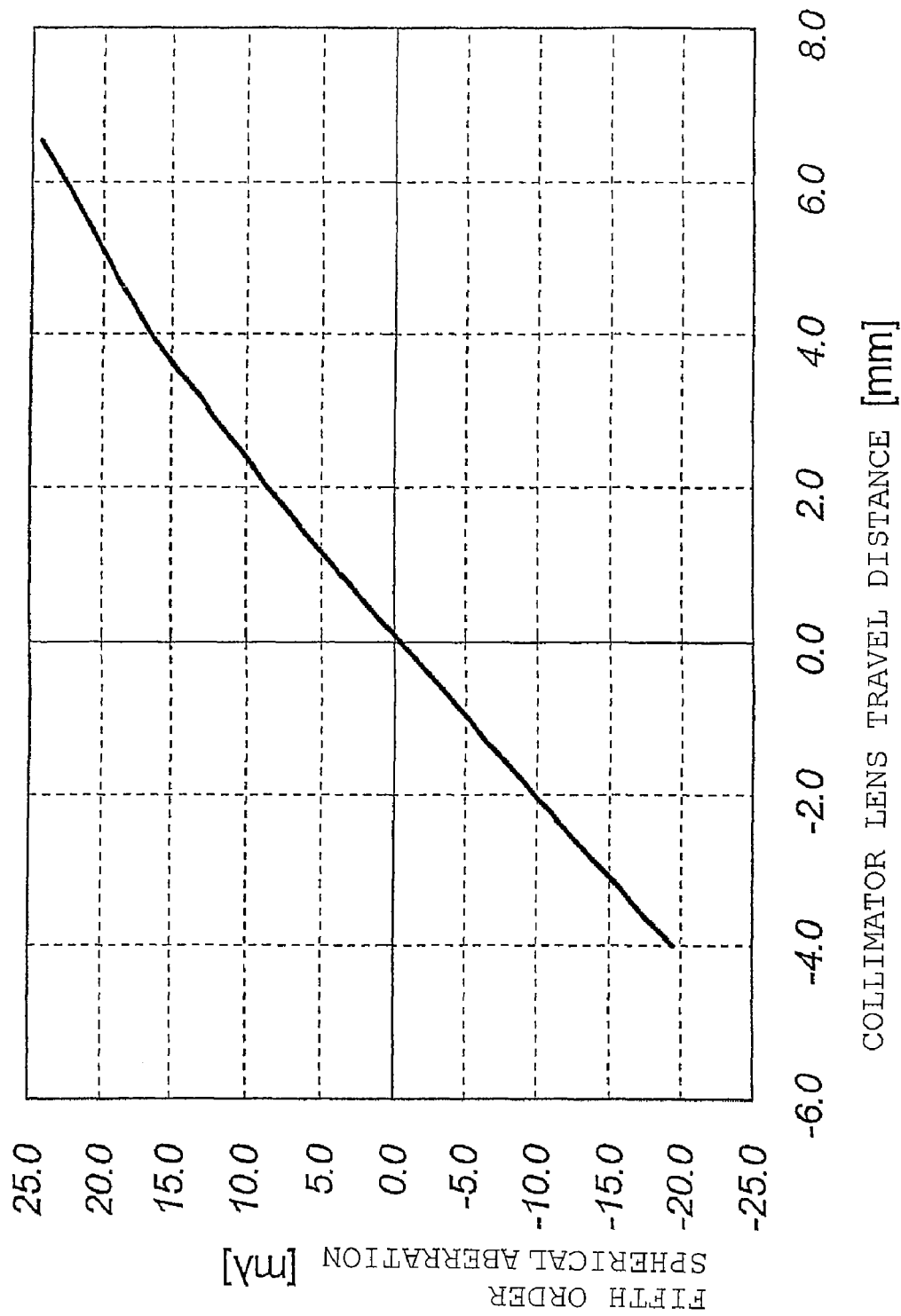
FIG. 6 is a diagram showing a relation between the collimator lens travel distance and the residual fifth order spherical aberration according to the embodiment of the present invention.

Furthermore, as in FIG. 6 led from FIGS. 3 and 4, the size of the fifth order spherical aberration is correlated with the travel distance of the collimator lens 4 on correcting the third order spherical aberration.

Therefore, it is possible to correct the fifth order spherical aberration by changing the voltage applied to the liquid crystal element 20 according to the travel distance of the collimator lens 4.

Figure 7:
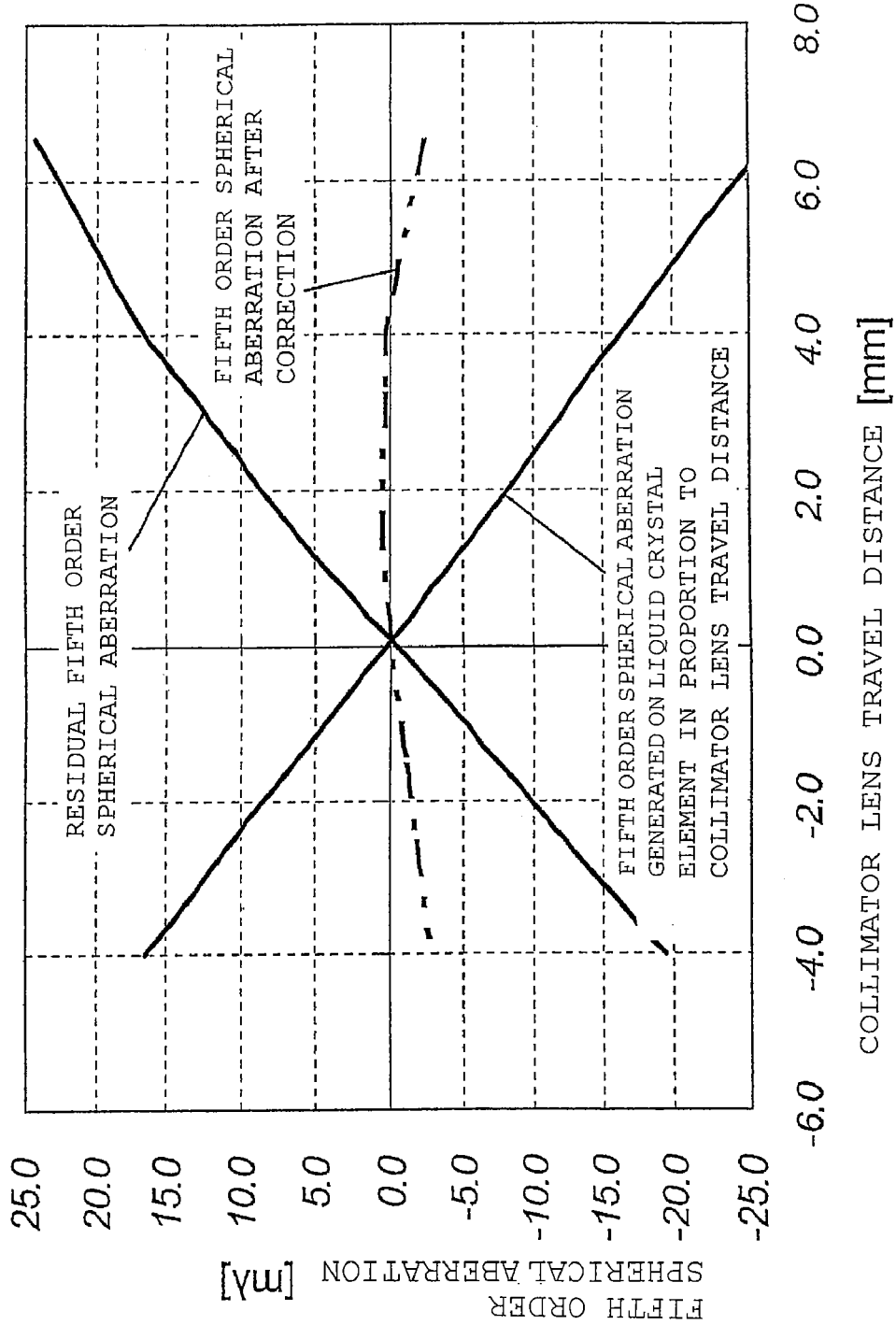
FIG. 7 is a diagram showing the relation between the collimator lens travel distance and the fifth order spherical aberration after correction according to a first embodiment of the present invention.

As shown in FIG. 7, the fifth order spherical aberration proportional to the travel distance of the collimator lens 4 is generated on the liquid crystal element 20, and is offset with the residual fifth order spherical aberration. It is thereby possible to keep an absolute value of the fifth order spherical aberration after the correction at 3 m$\lambda$ or less so as to secure good recording and/or reproduction as the optical head.

As shown in FIG. 1, it is desirable to have the liquid crystal element 20 mounted on the biaxial actuator 9 for driving the objective lens 6 and driven integrally with the objective lens 6. Such a configuration allows no coma aberration to be generated due to optical axis deviation of the liquid crystal element 20 and the objective lens 6.

Even in the case where the liquid crystal element 20 is not mounted on the biaxial actuator 9, however, the present invention is applicable by separately providing a minute feed mechanism of the optical head 10 or the like to minimize the coma aberration generated by the optical axis deviation of the liquid crystal element 20 and the objective lens 6.

It is also possible to use a suspension (not shown) for holding a movable portion of the biaxial actuator 9 as wiring in order to drive the liquid crystal element 20 mounted on the biaxial actuator 9. Furthermore, this suspension is often used as the wiring of a driving signal for driving the movable portion of the biaxial actuator 9. Therefore, it is possible, in that case, to drive the liquid crystal element 20 by superimposing the driving signal of the liquid crystal element 20 on the driving signal of the biaxial actuator 9 so as to simplify the wiring.

As for a method of having the travel distance of the collimator lens 4 detected by the applied voltage control portion 42, it is possible to either provide a sensor for detecting a position of the collimator lens 4 separately on the optical head 10 or calculate the position of the collimator lens 4 by monitoring a signal for controlling the position of a collimator lens actuator. It is also possible to directly detect the amount of the third order spherical aberration and the thickness of the light transmission layer to be corrected in advance and acquire the position of the collimator lens 4 therefrom. Under normal circumstances, however, a position detecting portion or a position control portion may be used as-is as the sensor of the collimator lens 4 in the case of correcting the third order spherical aberration.

Second Embodiment

Figure 8:
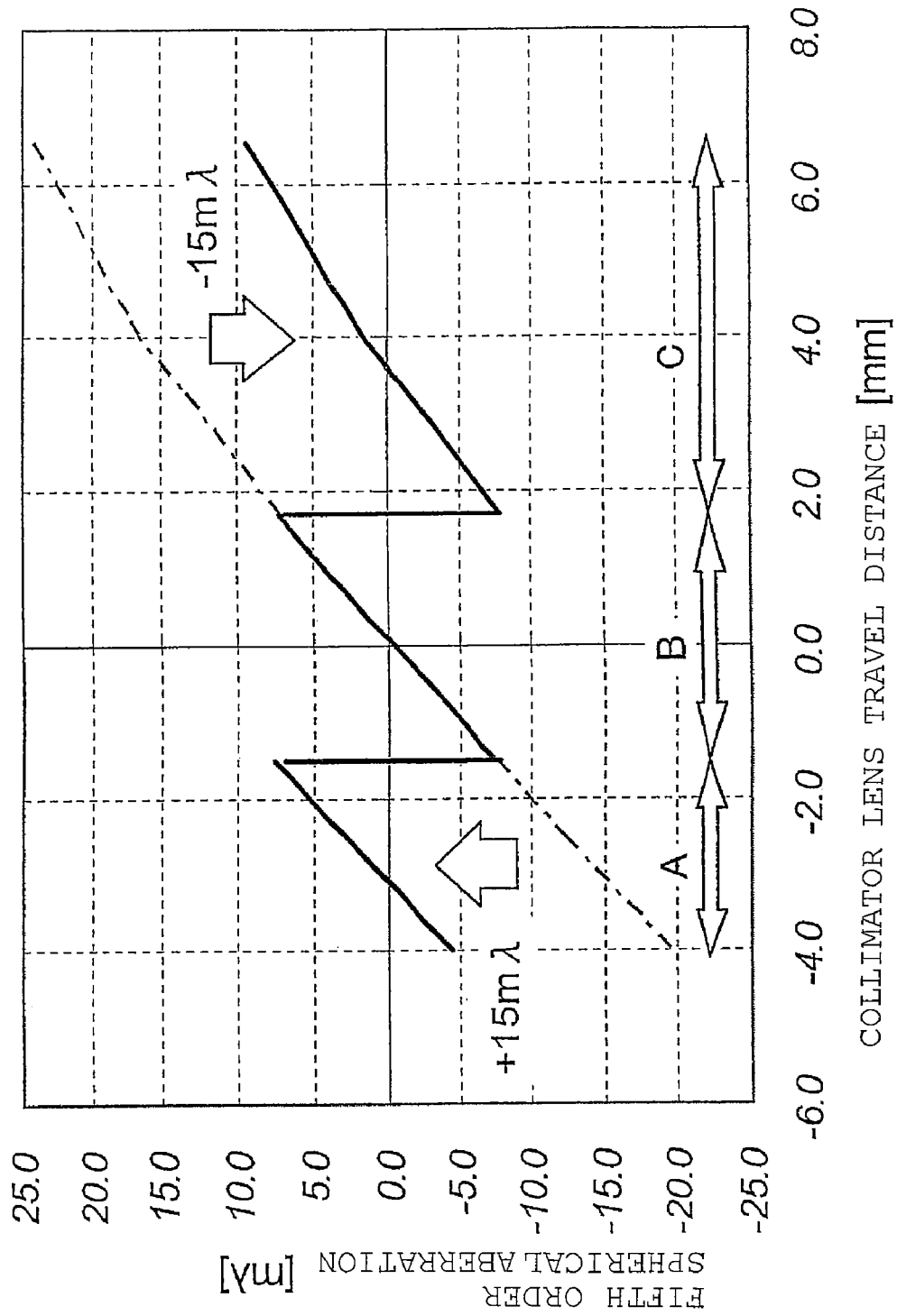
FIG. 8 is a diagram showing the relation between the collimator lens travel distance and the fifth order spherical aberration after correction according to a second embodiment of the present invention.

Next, a description will be given by using FIG. 8 as to a method of correcting the fifth order spherical aberration according to a second embodiment of the present invention. The same components as the first embodiment are given the same symbols, and a description thereof will be omitted hereunder.

According to the first embodiment, the voltage applied to the liquid crystal element 20 is changed according to the travel distance of the collimator lens 4. As the voltage is changed continuously according to the travel distance of the collimator lens 4, an amount of the correction of the fifth order spherical aberration also changes continuously.

In comparison, this embodiment is different in that the moving range of the collimator lens 4 is divided into three to provide the fifth order spherical aberration of a certain size to each of the divided ranges.

It will be described below. As shown in FIG. 8, the travel distance of the collimator lens 4 is divided into ranges A, B and C in the drawing. In the range A on the −direction side (the side receding from the optical information recording medium), a predetermined positive voltage is applied to the liquid crystal element 20 to generate the fifth order spherical aberration of a certain size+15 mλ. Similarly, in the range C on the +direction side (the side closer to the optical information recording medium), a predetermined negative voltage is applied to the liquid crystal element 20 to generate the fifth order spherical aberration of a certain size −15 mλ. No voltage is applied to the liquid crystal element 20 in the range B between the range A and the range C.

According to the control described above, the fifth order spherical aberration generated on the information recording surface makes a sawtooth change by monotonically increasing in each of the ranges A, B and C and abruptly decreasing on borders of the ranges. It is possible, however, to keep the absolute value of the fifth order spherical aberration after the correction at approximately 9 mλ or less which is a sufficient value for securing recording and reproduction functions of the optical head 10.

Thus, the voltage applied to the liquid crystal element 20 is controlled by three values so as to have the effect of securing the performance of the optical head 10 while reducing a load on the liquid crystal element 20.

No voltage is applied (0 V is applied) in the range B. It is possible, however, to apply the voltage of a predetermined value as long as the absolute value of the difference in the spherical aberration is held within 9 mλ.

Third Embodiment

Figure 9:
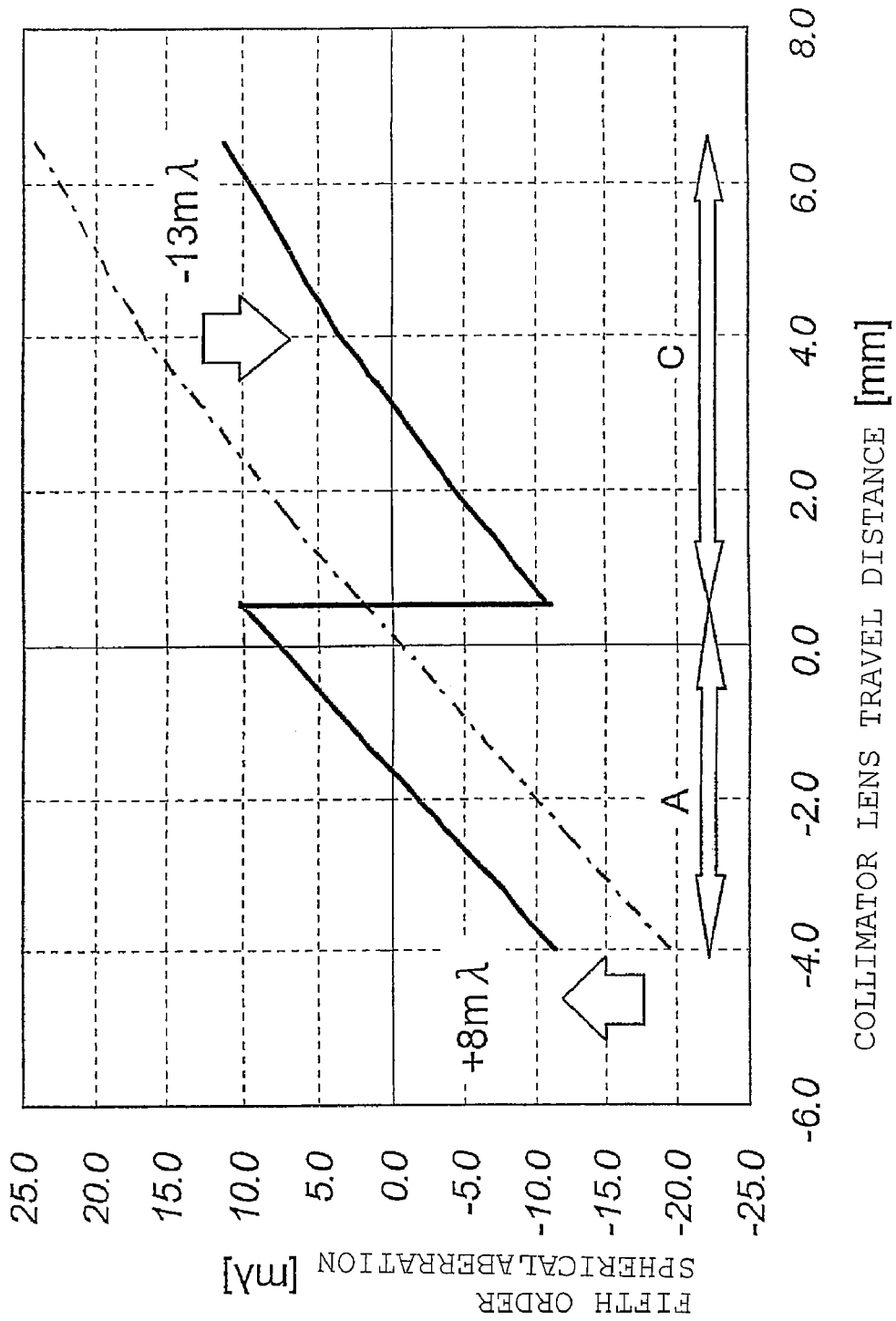
FIG. 9 is a diagram showing the relation between the collimator lens travel distance and the fifth order spherical aberration after correction according to a third embodiment of the present invention.

Next, a description will be given by using FIG. 9 as to the method of correcting the fifth order spherical aberration according to a third embodiment of the present invention. The same components as the first embodiment are given the same symbols, and a description thereof will be omitted hereunder.

According to the second embodiment, the moving range of the collimator lens 4 is divided into three to provide the fifth order spherical aberration of a certain size to each of the divided ranges. This embodiment is different in that the range is divided into two.

It will be described below. As shown in FIG. 9, the travel distance of the collimator lens 4 is divided into ranges A and C in the drawing. In the range A on the −direction side (the side receding from the optical information recording medium), a predetermined positive voltage is applied to the liquid crystal element 20 to generate the fifth order spherical aberration of a certain size+8 mλ. Similarly, in the range C on the +direction side (the side closer to the optical information recording medium), a predetermined negative voltage is applied to the liquid crystal element 20 to generate the fifth order spherical aberration of a certain size −13 mλ.

According to the control described above, the fifth order spherical aberration generated on the information recording surface monotonically increases in each of the ranges A and C and abruptly decreases on the borders of the ranges as with the second embodiment. As the divided ranges are rough, the absolute value of the fifth order spherical aberration after the correction is approximately 11 mλ, which is a sufficient value for securing the recording and reproduction functions of the optical head 10.

Thus, the voltage applied to the liquid crystal element 20 may be controlled by two values so as to have the same effect as the second embodiment.

Fourth Embodiment

Figure 10:
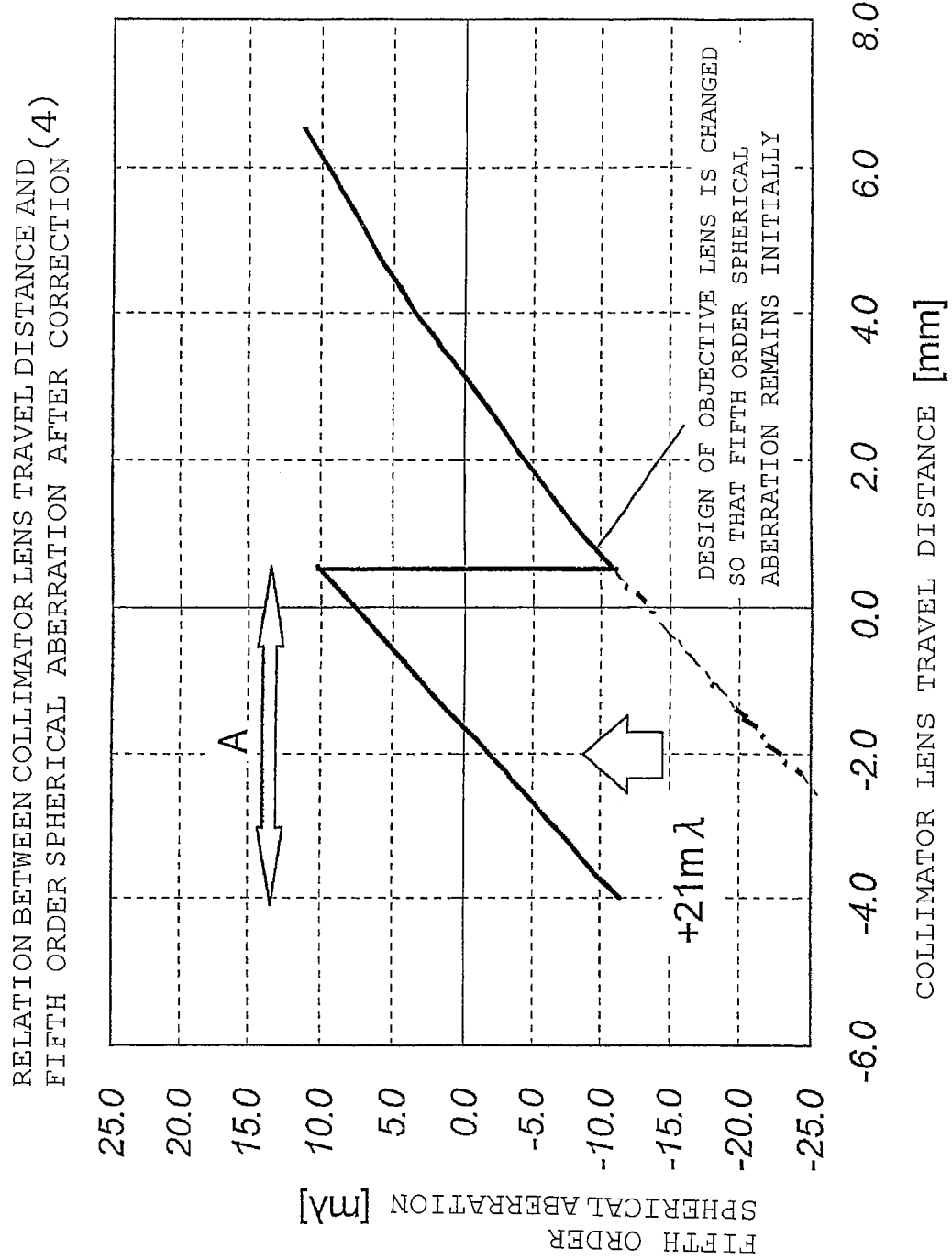
FIG. 10 is a diagram showing the relation between the collimator lens travel distance and the fifth order spherical aberration after correction according to a fourth embodiment of the present invention.

Next, a description will be given by using FIG. 10 as to the method of correcting the fifth order spherical aberration according to a fourth embodiment of the present invention. The same components as the first embodiment are given the same symbols, and a description thereof will be omitted hereunder.

According to the third embodiment, the moving range of the collimator lens 4 is divided into two to provide the fifth order spherical aberration of a certain size of ± to each of the divided ranges. This embodiment is different in that the voltage applied to the liquid crystal element 20 is substantially controlled by one value by generating the fifth order spherical aberration to be offset on the objective lens 6.

It will be described below. As shown in FIG. 10, the design of the objective lens 6 is changed to provide the fifth order spherical aberration of −13 mλ as an offset at the optimum material thickness of 62.5 μm at which the third order spherical aberration of the optical information recording medium 30 is minimal in reference to an initial state in which the travel distance of the collimator lens 4 is 0. And only in the case where the collimator lens 4 moves in the range A of FIG. 10, the predetermined voltage is applied to the liquid crystal element 20 to generate the fifth order spherical aberration +21 mλ of the reverse polarity to the offset. It is also possible, by such control over the liquid crystal element 20, to render the absolute value of the residual fifth order spherical aberration as 11 mλ or less so as to substantially improve the recording and reproduction performance.

In comparison with the third embodiment, this embodiment is particularly characterized in that the control of the liquid crystal element 20 is easier since only driving of the liquid crystal element 20 needs to be switched between on and off (1/0 control).

In the above description, the optimum material thickness is equivalent to a predetermined reference thickness at which the third order spherical aberration of the optical information recording medium is minimal. In the above description, the offset is the fifth order spherical aberration of the −direction. However, it may be given to the +direction. In this case, the fifth order spherical aberration of the −direction is generated on the liquid crystal element 20. In short, there should be a mutually offsetting and reversed relation between the polarity of the fifth order spherical aberration of the predetermined value as the offset generated by the design of the objective lens 6 and the polarity of the fifth order spherical aberration generated by the liquid crystal element 20.

According to the second to fourth embodiments, the moving range of the collimator lens 4 is divided into two or three to set the fifth order spherical aberration generated on the liquid crystal element 20 as the predetermined value as to each of the ranges. It is also possible, however, to divide the moving range into four or more and set the value of the fifth order spherical aberration as to each of the ranges.

Fifth Embodiment

Next, a description will be given by using FIG. 11 as to the method of correcting the fifth order spherical aberration according to a fifth embodiment of the present invention. The same components as the first embodiment are given the same symbols, and a description thereof will be omitted hereunder.

According to the second to fourth embodiments, the travel distance of the collimator lens 4 is detected, and the voltage applied to the liquid crystal element 20 is accordingly changed continuously or stepwise.

According to this embodiment in comparison, the travel distance of the collimator lens 4 is not detected, and the liquid crystal element 20 has the predetermined voltage applied thereto, which voltage is set according to each of the information recording surfaces as subjects of recording and reproduction based on which of the information recording surfaces 31 to 34 of the optical information recording medium 30 are used as the subjects of recording and reproduction performed by the optical head 10 so as to generate the fifth order spherical aberration and thereby reduce the absolute value of the fifth order spherical aberration generated on the information recording surfaces.

Figure 11:
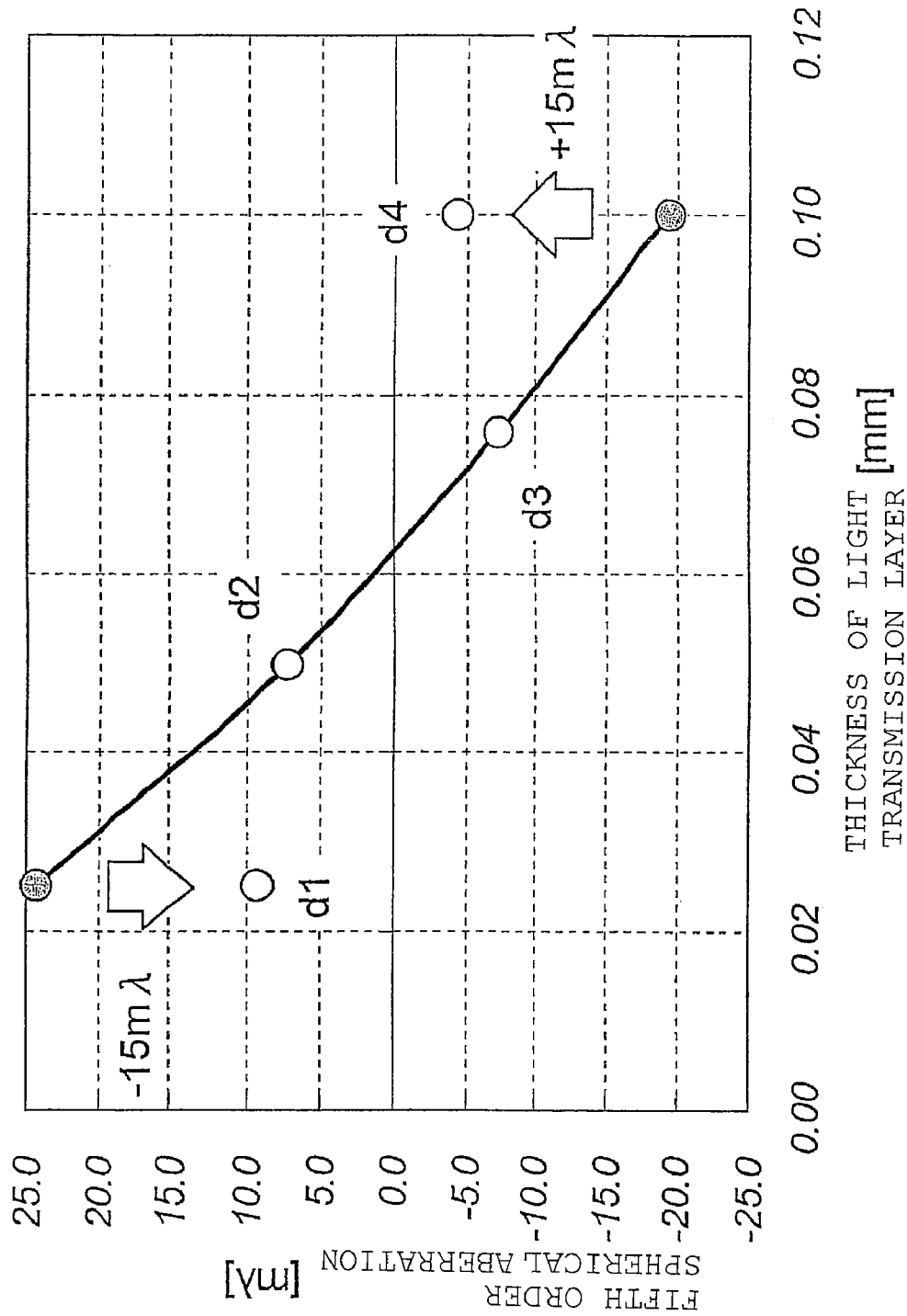
FIG. 11 is a diagram showing the relation between the thickness of the light transmission layer and the fifth order spherical aberration after correction according to a fifth embodiment of the present invention.

To be more precise, in the case of recording and reproducing information on the information recording surface 31 (thickness of the light transmission layer d1=25 μm) of the optical information recording medium 30 as shown in FIG. 11, the predetermined negative voltage is applied to the liquid crystal element 20 to generate the fifth order spherical aberration −15 mλ. And in the case of recording and reproducing information on the information recording surface 34 (thickness of the light transmission layer d4=100 μm) of the optical information recording medium 30, the predetermined positive voltage is applied to the liquid crystal element 20 to generate the fifth order spherical aberration +15 mλ. In the case of recording and reproducing information on the information recording surface 32 (thickness of the light transmission layer d2=50 μm) and the information recording surface 33 (thickness of the light transmission layer d3=75 μm), no voltage is applied to the liquid crystal element 20.

It is possible, by making such a correction, to render the absolute value of the residual fifth order spherical aberration on each of the information recording surfaces as 10 mλ or less. As the thickness of each of the light transmission layers has an error, the spherical aberration equivalent to that error remains in reality. However, the residual fifth order spherical aberration is 2 to 3 mλ if the thickness error of each of the light transmission layers is ±5 μm, which is substantially no problem.

It is predetermined on operation of the optical head 10 as to which of the information recording surfaces 31 to 34 the information is to be recorded and reproduced on. Therefore, the voltage to be applied to the liquid crystal element 20 should be selected and applied or not applied accordingly. To be more precise, it is also possible to determine the layers by monitoring an output signal from a layer determining portion for determining each of the information recording surfaces or a control signal for moving between the layers so as to correct the fifth order spherical aberration by applying a predetermined voltage to the liquid crystal element 20 in advance. Each of the information recording surfaces is determined by the applied voltage control portion 42. In the case of providing the layer determining portion, however, it may be provided either within the applied voltage control portion 42 or within the optical head 10 separately. It may also be provided within a control portion 52 of the optical information recording and reproducing apparatus described later. As the control signal for moving between the layers is given to the driving signal for driving the biaxial actuator, the applied voltage control portion 42 obtains the control signal therefrom.

Figure 12:
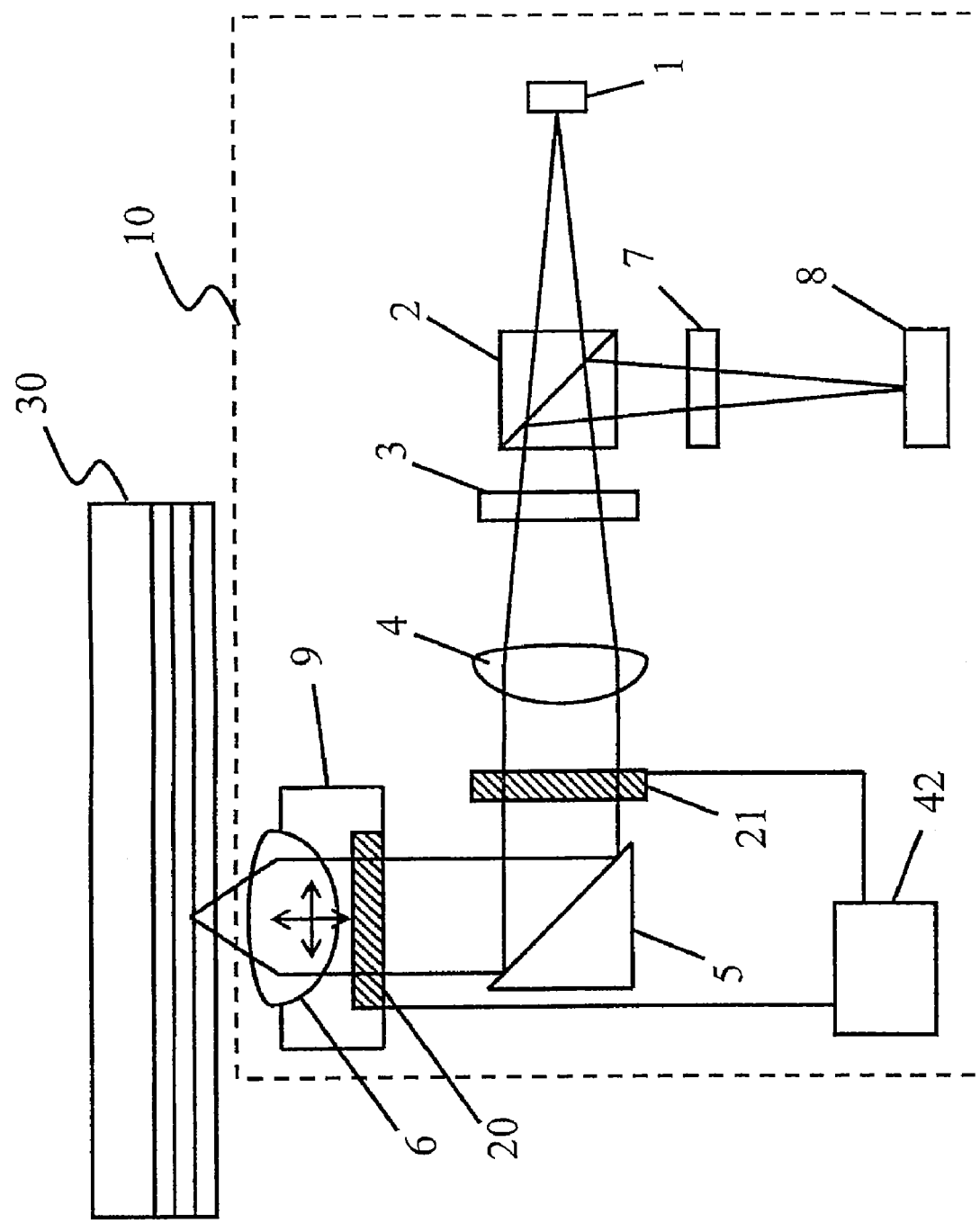
FIG. 12 is a schematic block diagram of the optical head according to another embodiment of the present invention.

The first to fifth embodiments mainly described the case of moving the collimator lens in an optical axis direction by using the stepping motor 40 as the first spherical aberration correcting portion for mainly correcting the third order spherical aberration. However, the first spherical aberration correcting portion of the present invention is not limited thereto. For instance, it is possible to use a lens such as a beam expander consisting of two groups of lenses placed in parallel light or another liquid crystal element 21 different from the liquid crystal element 20 mounted on the biaxial actuator as shown in FIG. 12. In FIG. 12, the liquid crystal element 21 has application of the voltage controlled by the applied voltage control portion 42 as with the liquid crystal element 20.

Figure 13:
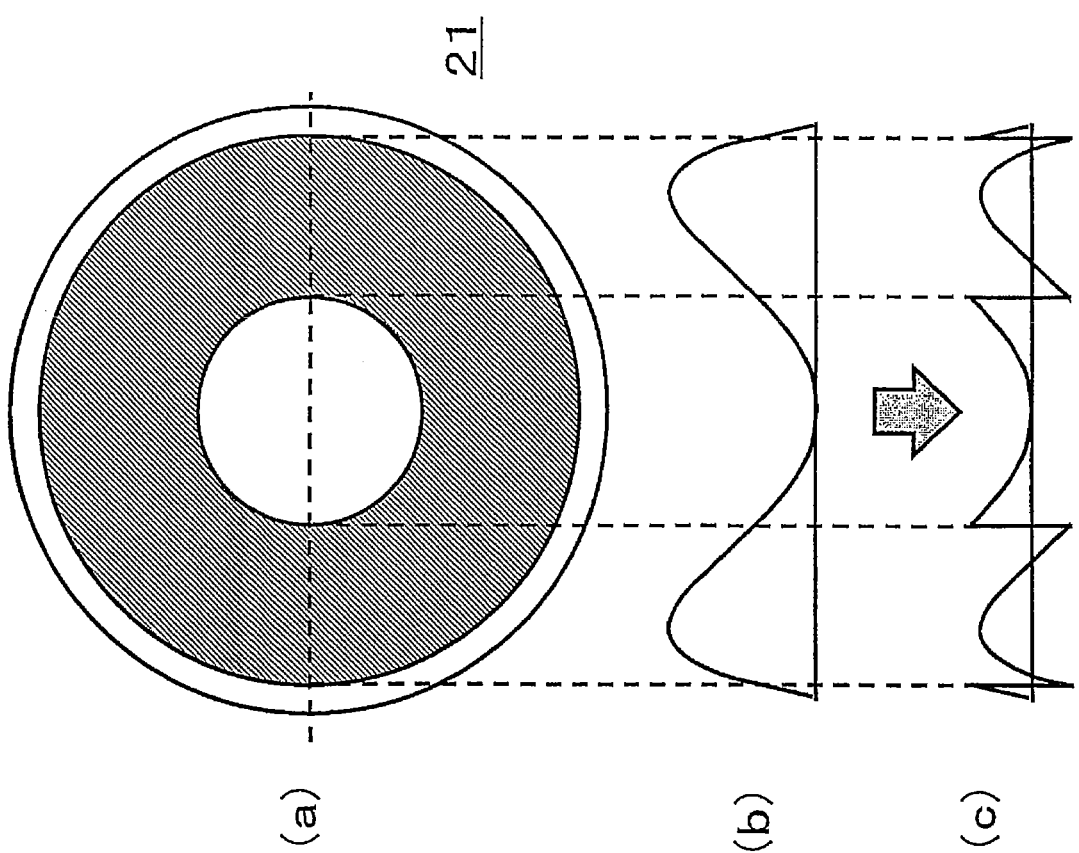
FIG. 13 (*a*) is a block diagram showing the electrode division pattern of a liquid crystal element 21 according to another embodiment of the present invention.

Here, FIG. 13 (*a*) shows an electrode pattern of the liquid crystal element 21, and FIG. 13 (*b*) shows the shape of the third order spherical aberration generated on the information recording surface of the optical information recording medium 30. The electrode pattern of the liquid crystal element 21 is formed in a concentric shape (shaded area in the drawing), and a predetermined voltage is applied by the control of the applied voltage control portion 42 so as to generate the phase difference between the transparent portions (white portions in the drawings) and the light passing through the electrode. The wave front having the phase difference generated thereon takes on the wave front shape shown in FIG. 13 (*c*) so that it becomes possible to reduce the third order spherical aberration.

Figure 14:
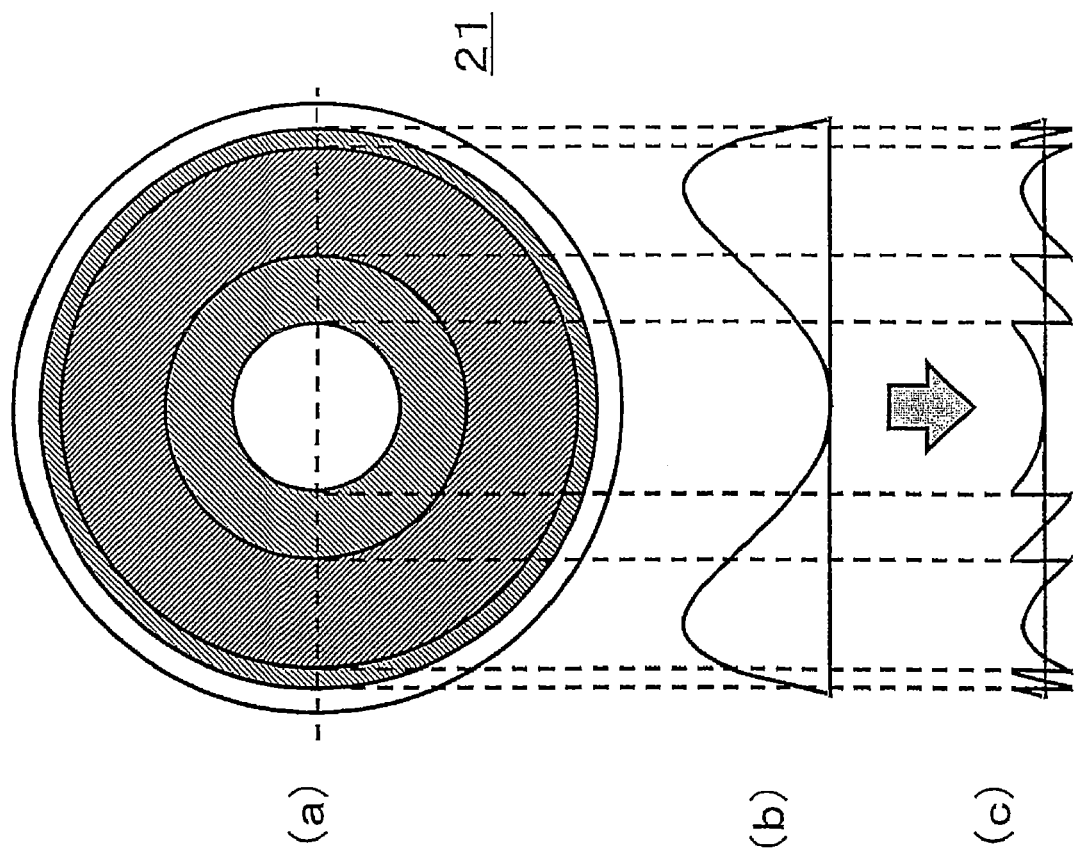
FIG. 14 (*a*) is a block diagram showing another example of the electrode division pattern of the liquid crystal element 21 according to another embodiment of the present invention.

As a multilayer optical information recording medium to which the present invention is applicable has a large absolute value of the spherical aberration due to the thickness of the light transmission layers, the liquid crystal element 21 may be the configuration example shown in FIG. 14 (*a*) in order to further reduce the spherical aberration.

The configuration example shown in FIG. 13 (*a*) includes one concentric liquid crystal layer region. The configuration example shown in FIG. 14 (*a*) divides a liquid crystal layer for applying the voltage further into three concentric regions, and applies to each of the regions the voltage corresponding to a third order spherical aberration pattern shown in FIG. 14 (*b*). It is possible to render it as the wave front shape shown in FIG. 14 (*c*) by dividing the region for generating the spherical aberration and generating a different phase difference in each of the regions so as to reduce the third order spherical aberration.

If the region for generating the spherical aberration is divided into four or more, the absolute value of the aberration of each individual region can become smaller so that a higher aberration correcting capability can be obtained. As the number of electrode layers to be connected to the liquid crystal element 21 increases, however, it is desirable to follow the extent of this configuration example.

In the above configuration, the amount of the third order spherical aberration corrected by the liquid crystal element 21 is set by a voltage level applied to the liquid crystal element 21. Therefore, the applied voltage control portion 42 uses the voltage level set to the liquid crystal element 21 as a substitute for a position of the above-mentioned collimator lens 4, a control signal of the position and the like, and controls voltage application of the liquid crystal element 20 as with each of the first to fourth embodiments.

Figure 15:
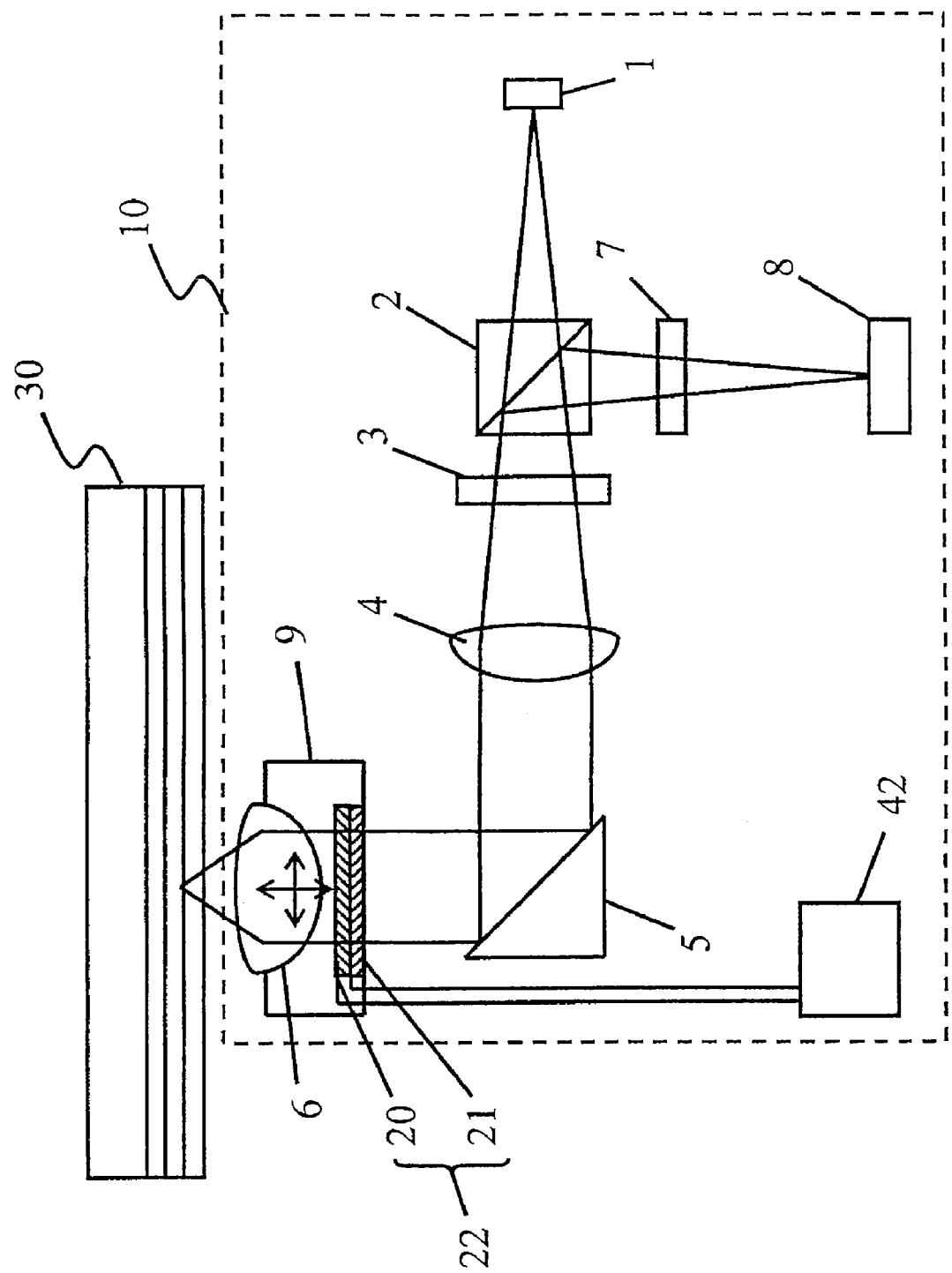
FIG. 15 is a schematic block diagram of the optical head according to another embodiment of the present invention.

As shown in FIG. 15, it is also possible to use a composite liquid crystal element 22 integrally configured by the liquid crystal element 21 and the liquid crystal element 20 for correcting the fifth order spherical aberration mounted on the biaxial actuator 9. There is an advantage, by having such a configuration, that the coma aberration due to the optical axis deviation of the composite liquid crystal element 22 and the objective lens 6 is no longer generated.

The configurations shown in FIGS. 13 and 15 allow the spherical aberration to be electrically eliminated entirely so that there is no longer the need for the collimator lens actuator such as the stepping motor 40 which is a mechanical configuration for eliminating the third order spherical aberration. Thus, there is a merit that the configuration of the optical head is simplified and its weight is reduced.

Figure 16:
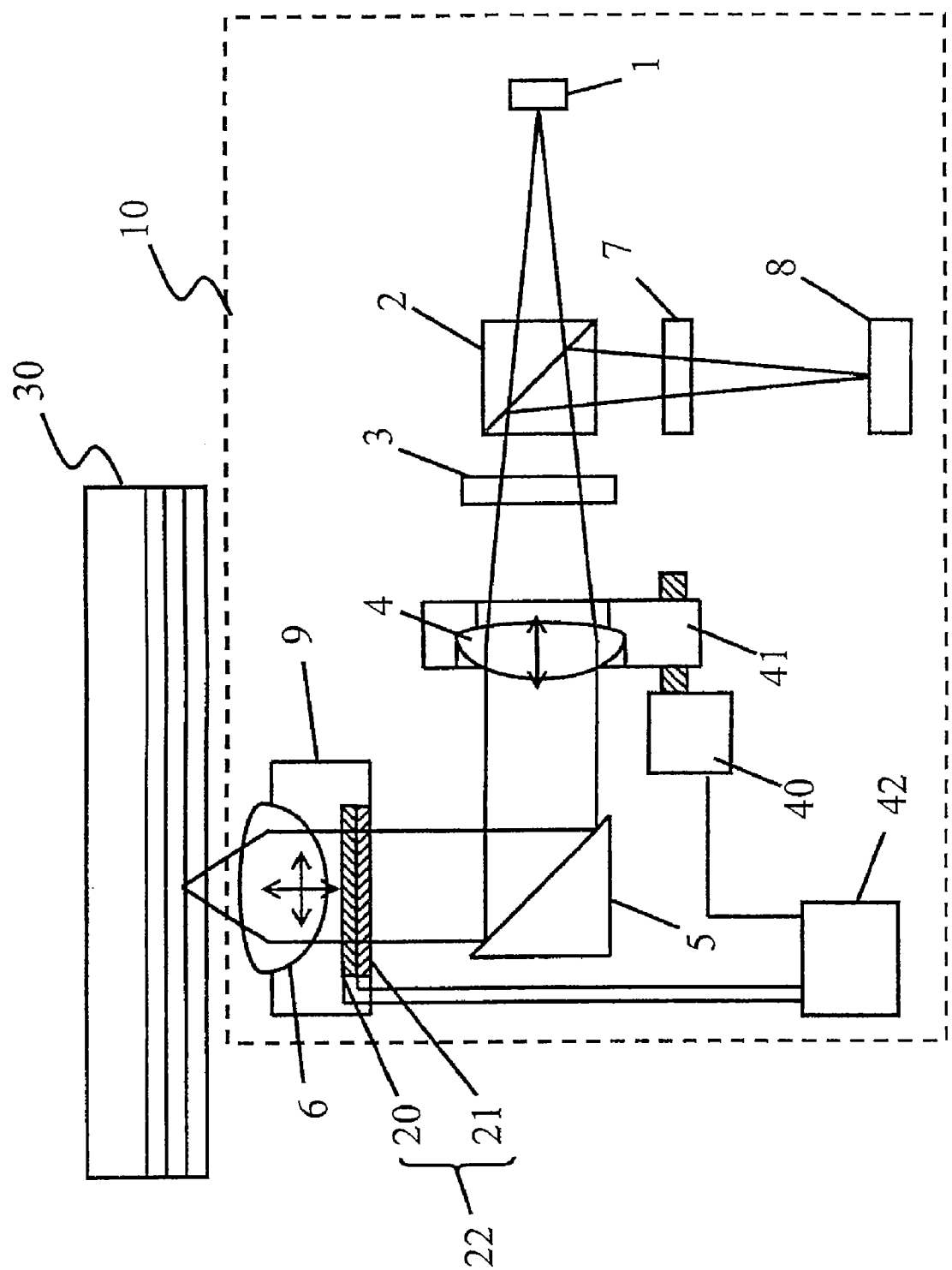
FIG. 16 is a schematic block diagram of the optical head according to another embodiment of the present invention.

Furthermore, it is apparent, as shown in FIG. 16, that the first spherical aberration correcting portion of the present invention may also have the configuration for correcting a part of the third order spherical aberration with the collimator lens 4 and correcting the rest with the liquid crystal element 21 of the composite liquid crystal element 22 mounted on the biaxial actuator 9. Such a configuration allows the movable range of the collimator lens 4 to be reduced. Thus, there is a merit that the optical head can be miniaturized and rendered thinner. In this case, elimination of the fifth order spherical aberration by the liquid crystal element 20 is controlled by the applied voltage control portion 42 based on the applied voltage of the liquid crystal element 20, a driving amount of the stepping motor 40 of the collimator lens 4, the position of the collimator lens 4 and the like.

The second spherical aberration correcting portion of the present invention for correcting the fifth order spherical aberration is not limited to the liquid crystal element 20 but may also be an instrument which can eliminate the fifth order spherical aberration by using another electrical and mechanical configuration, which is included in the scope of application of the present invention as a matter of course.

Sixth Embodiment

Figure 17:
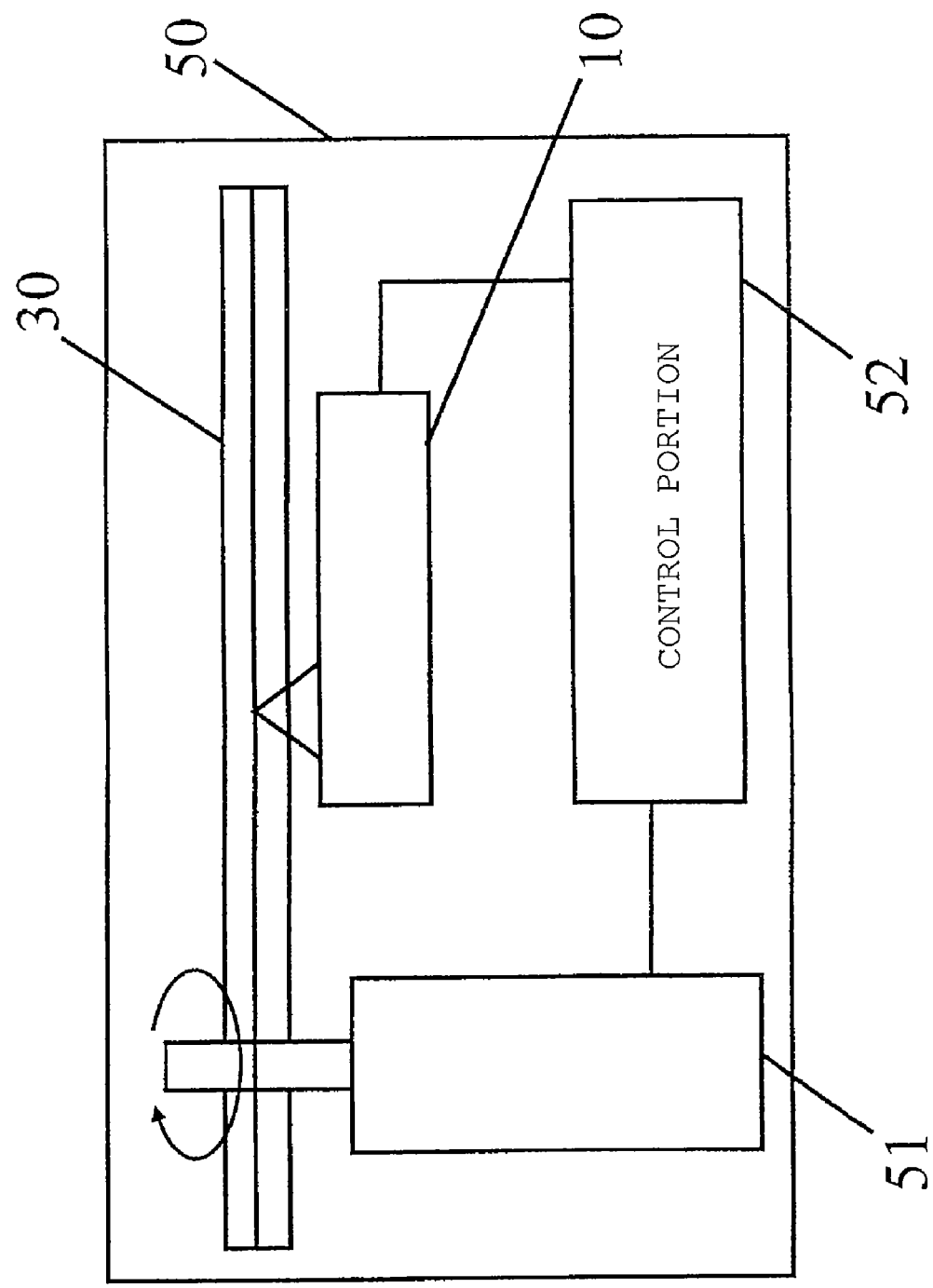
FIG. 17 is a schematic block diagram of an optical information recording and reproducing apparatus according to a sixth embodiment of the present invention.
Figure 18:
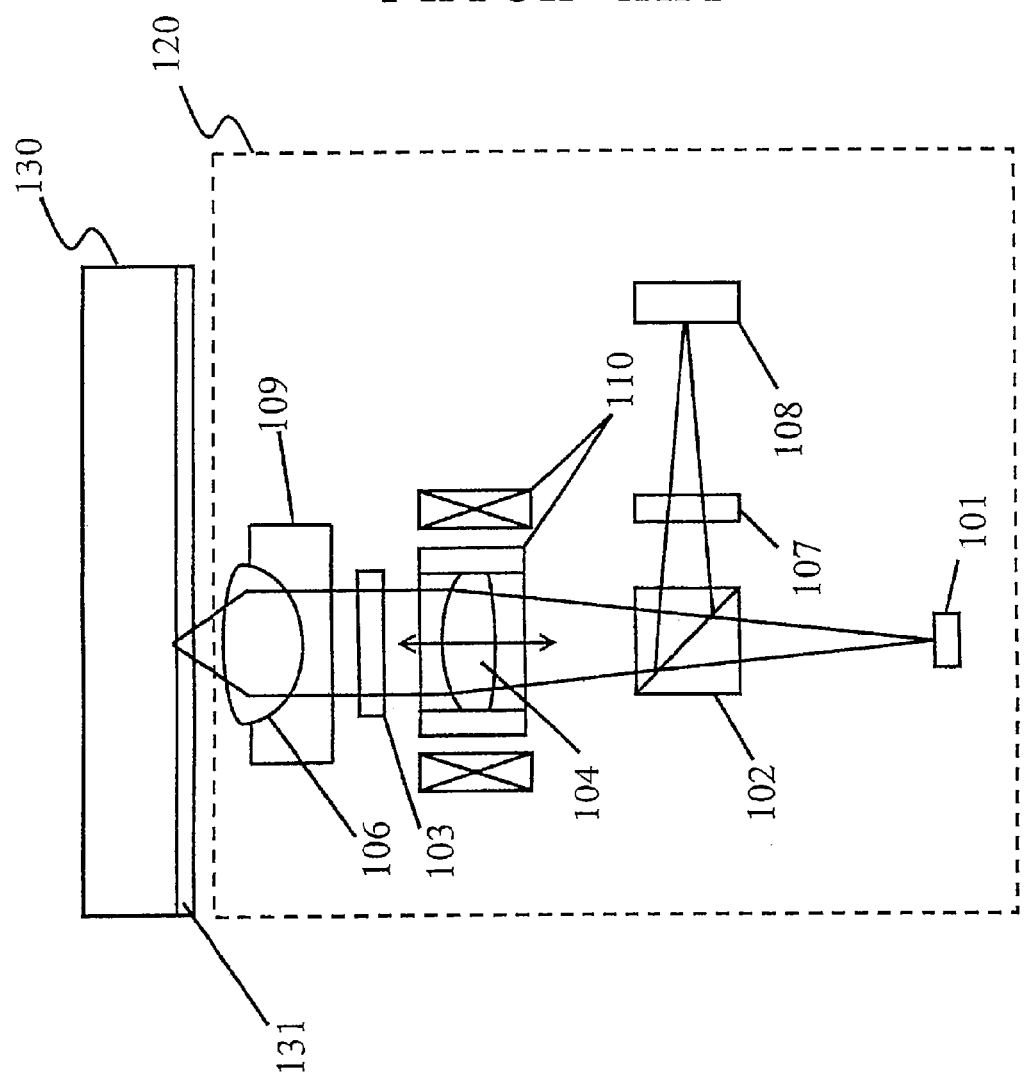
FIG. 18 is a schematic block diagram of a conventional optical information recording and reproducing apparatus.
Figure 19:
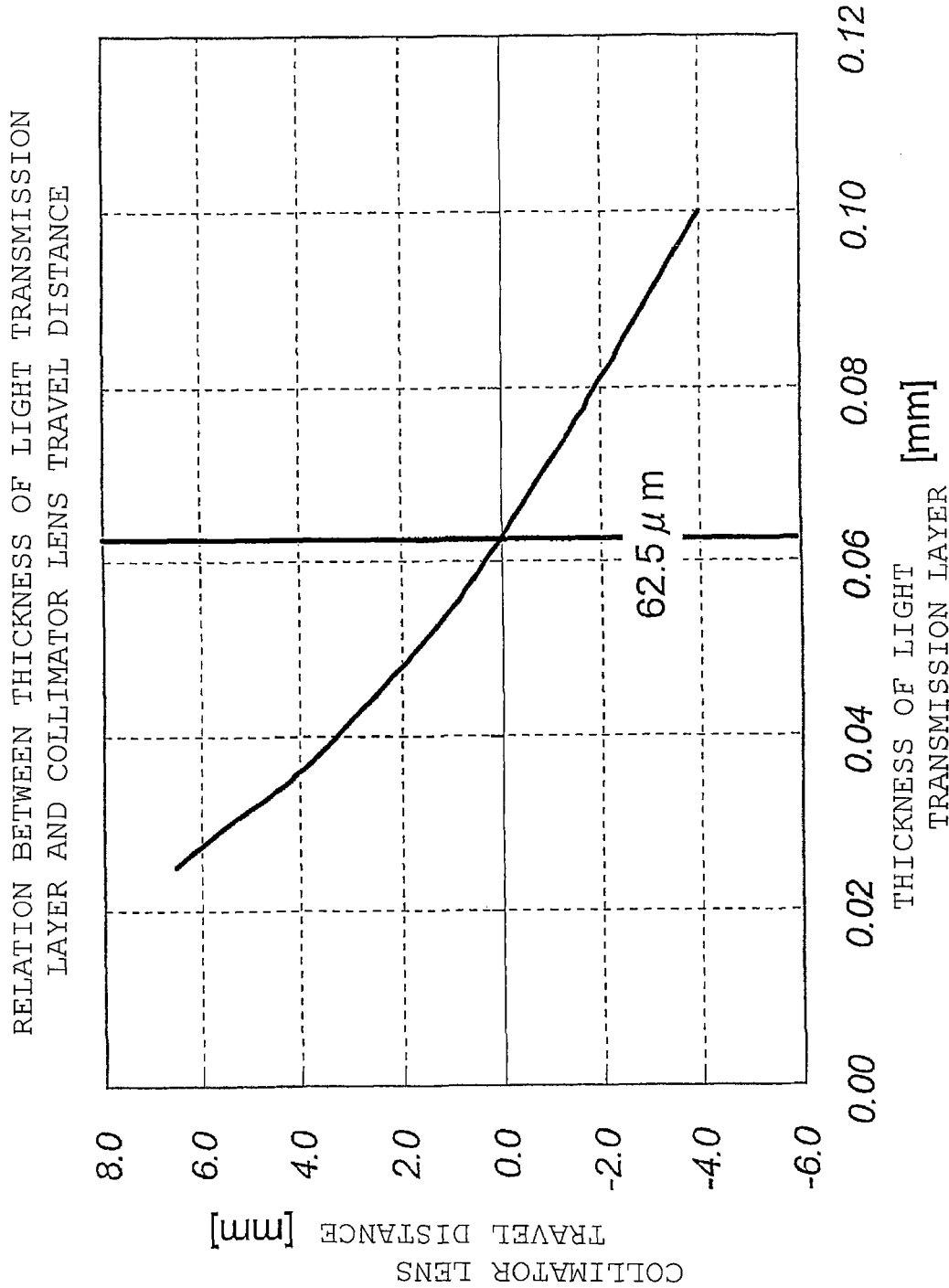
FIG. 19 is a diagram showing the relation between the thickness of the light transmission layer and the collimator lens travel distance.
Figure 20:
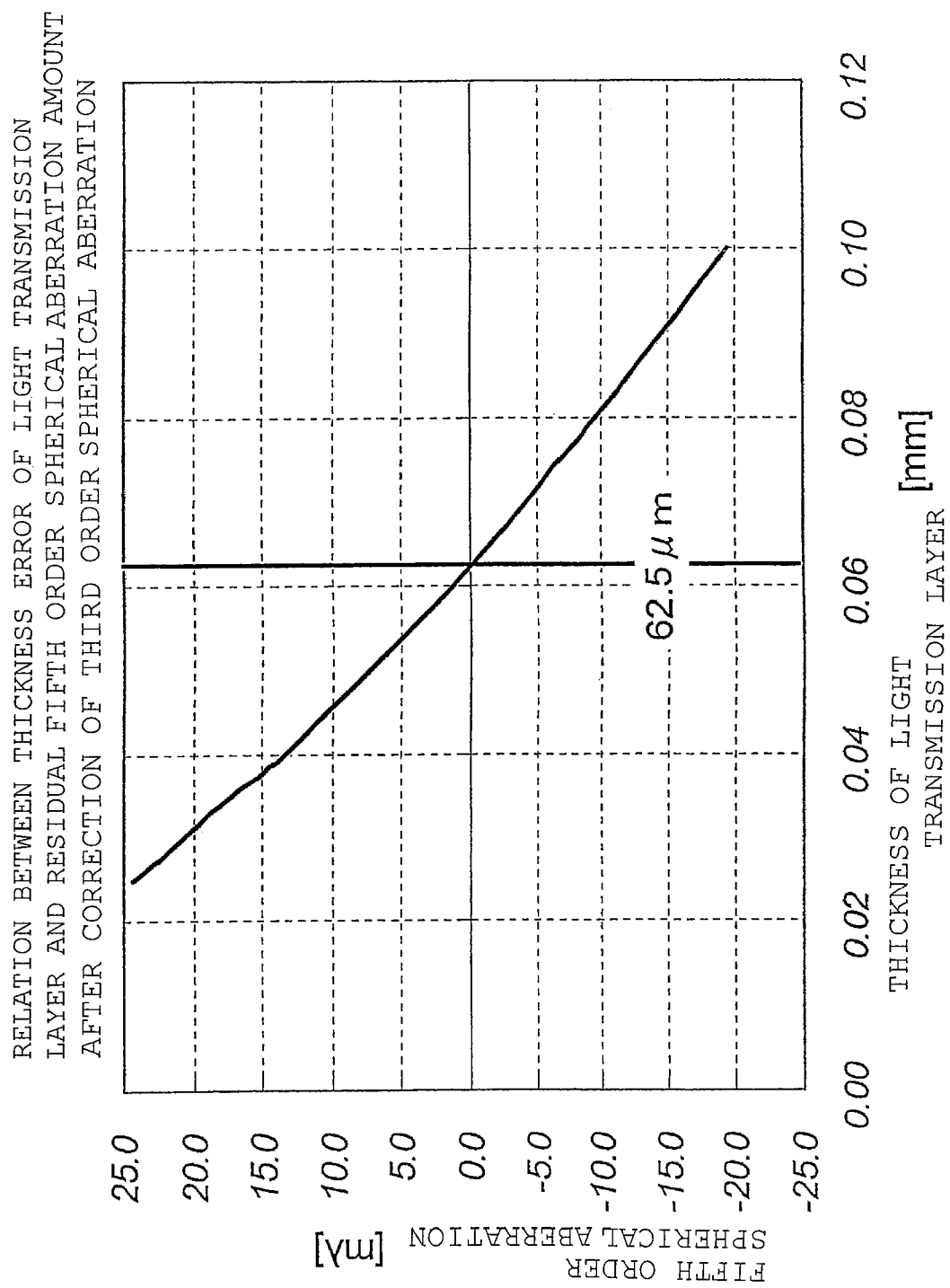
FIG. 20 is a diagram showing the relation between a thickness error of the light transmission layer and a residual fifth order spherical aberration amount after correction of the third order spherical aberration.

FIG. 17 is a schematic block diagram of the optical information recording and reproducing apparatus according to a sixth embodiment of the present invention.

In FIG. 17, reference numeral 50 denotes a housing of the entire optical information recording and reproducing apparatus, and an optical information recording medium drive 51, the control portion 52 and the optical head 10 are provided inside the housing 50. Reference numeral 30 denotes an optical information recording medium. The optical information recording medium drive 51 has a function of rotatively driving the optical information recording medium 30, and the optical head 10 is one of the optical heads described in the first to fifth embodiments. The control portion 52 has a function of driving and controlling the optical information recording medium drive 51 and the optical head 10, a function of processing the control signal and an information signal received by the optical head 10 and a function of interfacing the information signals inside and outside the housing 50.

The optical information recording and reproducing apparatus of this embodiment has one of the optical heads of the first to fifth embodiments mounted thereon as the optical head 10. Therefore, it can additionally correct the fifth order spherical aberration newly generated on correcting the third order spherical aberration which is generated along with the change in thickness of the light transmission layer of the optical information recording medium 30 so as to improve recording and reproducing properties of the optical information recording medium 30.

INDUSTRIAL APPLICABILITY

The present invention includes a fifth order spherical aberration correcting portion in addition to a third order spherical aberration correcting portion.

Therefore, it is useful for the optical information recording and reproducing apparatus for reproducing or recording information on the optical information recording medium having multilayer information recording surfaces.

The invention claimed is:

1. An optical head comprising:
a light source;
an objective lens for collecting a laser beam emitted from the light source on an optical information recording medium; and
a spherical aberration correcting portion for correcting spherical aberration generated according to a thickness of a light transmission layer of the optical information recording medium, wherein
the spherical aberration correcting portion includes:
a first spherical aberration correcting portion for correcting third order spherical aberration; and
a second spherical aberration correcting portion for correcting fifth order spherical aberration, wherein
the second spherical aberration correcting portion corrects the fifth order spherical aberration according to an amount of the third order spherical aberration which the first spherical aberration correcting portion corrects.

2. The optical head according to claim 1, wherein
the second spherical aberration correcting portion selects a predetermined correction amount from multiple preset fifth order spherical aberration correction amounts according to the amount of the third order spherical aberration which the first spherical aberration correcting portion corrects, and corrects the fifth order spherical aberration by the selected correction amount.

3. The optical head according to claim 2, wherein
the objective lens is designed to generate the fifth order spherical aberration of a predetermined value at a predetermined reference thickness at which the third order spherical aberration of the optical information recording medium is minimal; and
the second spherical aberration correcting portion corrects the fifth order spherical aberration by generating the fifth order spherical aberration of a reverse polarity to the fifth order spherical aberration of the predetermined value.

4. The optical head according to claim 1, wherein
the first spherical aberration correcting portion includes a collimator lens for moving in an optical axis direction of the laser beam, and corrects the third order spherical aberration by moving the collimator lens; and
the second spherical aberration correcting portion corrects the fifth order spherical aberration by using a position of the collimator lens as an amount corresponding to the amount of the third order spherical aberration which the first spherical aberration correcting portion corrects.

5. The optical head according to claim 1, wherein
the first spherical aberration correcting portion includes a collimator lens for moving in an optical axis direction of the laser beam, and corrects the third order spherical aberration by moving the collimator lens; and
the second spherical aberration correcting portion corrects the fifth order spherical aberration by using an output value of a position signal according to the position of the collimator lens as the amount corresponding to the amount of the third order spherical aberration which the first spherical aberration correcting portion corrects.

6. The optical head according to claim 1, wherein
the first spherical aberration correcting portion includes a collimator lens for moving in an optical axis direction of the laser beam, and corrects the third order spherical aberration by moving the collimator lens; and
the second spherical aberration correcting portion corrects the fifth order spherical aberration by using an output of a driving signal for driving the collimator lens as the amount corresponding to the amount of the third order spherical aberration which the first spherical aberration correcting portion corrects.

7. The optical head according to claim 1, wherein
the second spherical aberration correcting portion includes a liquid crystal element.

8. The optical head according to claim 7, wherein the liquid crystal element is provided to a movable portion of an actuator for driving the objective lens.

9. The optical head according to claim 8, wherein the liquid crystal element is driven through a suspension for holding the movable portion of the actuator.

10. The optical head according to claim 9, wherein a driving signal for driving the liquid crystal element is superimposed on a driving signal for driving the movable portion of the actuator.

11. The optical head according to claim 7, wherein
the first spherical aberration correcting portion includes the liquid crystal element and corrects the third order spherical aberration by applying a voltage to the liquid crystal element; and
the second spherical aberration correcting portion corrects the fifth order spherical aberration by using a voltage level applied to the liquid crystal element of the first spherical aberration correcting portion as the amount corresponding to the amount of the third order spherical aberration which the first spherical aberration correcting portion corrects.

12. The optical head according to claim 11, wherein the liquid crystal element of the first spherical aberration correcting portion and the liquid crystal element of the second spherical aberration correcting portion are integrally formed.

13. The optical head according to claim 11, wherein the liquid crystal element of the first spherical aberration correcting portion and the liquid crystal element of the second spherical aberration correcting portion are separate liquid crystal elements respectively.

14. The optical head according to claim 1, wherein
the first spherical aberration correcting portion includes a collimator lens for moving in an optical axis direction of the laser beam and a liquid crystal element, and corrects a part of the third order spherical aberration by moving the collimator lens and corrects the rest of the third order spherical aberration by applying a voltage to the liquid crystal element.

15. An optical information recording and reproducing apparatus comprising:
the optical head according to claim 1;
a drive for driving the optical information recording medium; and
a control portion for controlling the optical head and the drive.

* * * * *

UNITED STATES PATENT AND TRADEMARK OFFICE
CERTIFICATE OF CORRECTION

| | | |
|---|---|---|
| PATENT NO. | : 7,773,468 B2 | |
| APPLICATION NO. | : 11/570821 | |
| DATED | : August 10, 2010 | |
| INVENTOR(S) | : Fumitomo Yamasaki et al. | |

It is certified that error appears in the above-identified patent and that said Letters Patent is hereby corrected as shown below:

On the Title Page, please insert FIELD [30] entitled "Foreign Application Priority Data" and add the following as indicated on the enclosed copy of the Declaration and Power of Attorney filed on December 18, 2006:

-- (30) Foreign Application Priority Data

April 21, 2005 [JP]    2005-123216 --

Signed and Sealed this
First Day of March, 2011

David J. Kappos
*Director of the United States Patent and Trademark Office*